US010435026B2

(12) United States Patent
Shively et al.

(10) Patent No.: US 10,435,026 B2
(45) Date of Patent: Oct. 8, 2019

(54) TWIN ENGINE POWER UNITER

(71) Applicant: Oshkosh Corporation, Oshkosh, WI (US)

(72) Inventors: Jason Shively, Oshkosh, WI (US); Martin Schimke, Oshkosh, WI (US); Andrew Kotloski, Neenah, WI (US); Seth Newlin, Appleton, WI (US); David Kay, Appleton, WI (US); Chad Hartfiel, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/890,692

(22) Filed: Feb. 7, 2018

(65) Prior Publication Data

US 2018/0222484 A1 Aug. 9, 2018

Related U.S. Application Data

(60) Provisional application No. 62/456,413, filed on Feb. 8, 2017.

(51) Int. Cl.
*B60W 30/188* (2012.01)
*B60K 25/02* (2006.01)
(Continued)

(52) U.S. Cl.
CPC ......... *B60W 30/1888* (2013.01); *A62C 27/00* (2013.01); *B60K 5/08* (2013.01);
(Continued)

(58) Field of Classification Search
None
See application file for complete search history.

(56) References Cited

U.S. PATENT DOCUMENTS 7,073,620 B2  7/2006 Braun et al.
7,198,130 B2  4/2007 Schimke
(Continued)

FOREIGN PATENT DOCUMENTS

CN  203283029 U  11/2013
CN  203289029     11/2013

OTHER PUBLICATIONS

International Search Report and Written Opinion regarding International Application No. PCT/US2018/017230, dated May 30, 2018, 16 pps.

*Primary Examiner* — Justin Holmes
(74) *Attorney, Agent, or Firm* — Foley & Lardner LLP

(57) ABSTRACT

A vehicle includes a chassis, a driveline and an accessory coupled to the chassis and configured to receive rotational mechanical energy, a first driver and a second driver coupled to the chassis and configured to provide rotational mechanical energy, and a power transmission device. The power transmission device includes a housing coupled to the chassis, a first input shaft configured to receive the rotational mechanical energy from the first driver, a second input shaft configured to receive the rotational mechanical energy from the second driver, a primary output interface coupled to the driveline, a power takeoff shaft radially aligned with the first input shaft and coupled to the accessory, a first clutch configured to selectively rotationally couple the first input shaft to the primary output interface, and a second clutch configured to selectively rotationally couple the first input shaft to the power takeoff shaft.

20 Claims, 17 Drawing Sheets

(51) Int. Cl.
  *B60K 17/28* (2006.01)
  *F02D 25/00* (2006.01)
  *A62C 27/00* (2006.01)
  *B60W 10/30* (2006.01)
  *B60W 10/06* (2006.01)
  *B60K 25/06* (2006.01)
  *B60K 6/08* (2006.01)
  *B60K 5/08* (2006.01)
  *B60K 6/48* (2007.10)
  *F16H 37/04* (2006.01)
  *B60K 1/02* (2006.01)
  *B60K 17/02* (2006.01)
  *B60K 17/344* (2006.01)
  *B60K 17/346* (2006.01)

(52) U.S. Cl.
  CPC .............. *B60K 6/08* (2013.01); *B60K 6/48* (2013.01); *B60K 17/28* (2013.01); *B60K 25/02* (2013.01); *B60K 25/06* (2013.01); *B60W 10/06* (2013.01); *B60W 10/30* (2013.01); *F02D 25/00* (2013.01); *B60K 1/02* (2013.01); *B60K 17/02* (2013.01); *B60K 17/344* (2013.01); *B60K 17/346* (2013.01); *B60K 2025/065* (2013.01); *B60Y 2200/14* (2013.01); *B60Y 2200/142* (2013.01); *F16H 37/041* (2013.01)

(56) References Cited

U.S. PATENT DOCUMENTS

| | | |
|---|---|---|
| 7,258,194 B2 | 8/2007 | Braun et al. |
| 7,357,203 B2 | 4/2008 | Morrow et al. |
| 7,448,460 B2 | 11/2008 | Morrow et al. |
| 7,824,293 B2 | 11/2010 | Schimke |
| 7,931,103 B2 | 4/2011 | Morrow et al. |
| 8,123,645 B2 | 2/2012 | Schimke |
| 8,337,352 B2 | 12/2012 | Morrow et al. |
| 8,561,735 B2 | 10/2013 | Morrow et al. |
| 8,864,613 B2 | 10/2014 | Morrow et al. |
| 9,008,913 B1 | 4/2015 | Sears et al. |
| 9,174,686 B1 | 11/2015 | Messina et al. |
| 9,315,210 B2 | 4/2016 | Sears et al. |
| 9,428,042 B2 | 8/2016 | Morrow et al. |
| 9,493,921 B2 | 11/2016 | Amin et al. |
| 9,656,659 B2 | 5/2017 | Shukla et al. |
| 9,707,869 B1 | 7/2017 | Messina et al. |
| 9,908,520 B2 | 3/2018 | Shukla et al. |
| 2010/0219007 A1* | 9/2010 | Dalum ............... B60L 50/16 180/65.22 |
| 2011/0275470 A1* | 11/2011 | Ekonen ............... B60K 17/35 475/198 |
| 2011/0287893 A1 | 11/2011 | Mueller et al. |
| 2012/0322615 A1* | 12/2012 | Matsuzaki ........ F16H 61/0246 477/79 |
| 2014/0060953 A1* | 3/2014 | Wetterlund ......... B60K 26/02 180/233 |
| 2014/0171259 A1* | 6/2014 | Genise ................ F16D 21/00 477/5 |
| 2015/0135863 A1 | 5/2015 | Dalum |
| 2016/0091078 A1* | 3/2016 | Fukunaga ............ F16H 47/02 74/11 |
| 2016/0281821 A1* | 9/2016 | Matsuura .............. B60K 17/10 |
| 2016/0361987 A1 | 12/2016 | Morrow et al. |
| 2017/0008397 A1* | 1/2017 | Kajino ................. B60K 17/28 |
| 2017/0050063 A1 | 2/2017 | Shively et al. |
| 2017/0051462 A1 | 2/2017 | Amin et al. |
| 2017/0108085 A1 | 4/2017 | Morrow et al. |
| 2017/0246946 A1 | 8/2017 | Morrow et al. |
| 2017/0246947 A1 | 8/2017 | Kotloski et al. |
| 2017/0370446 A1 | 12/2017 | Steinberger et al. |
| 2018/0031085 A1 | 2/2018 | Steinberger et al. |

* cited by examiner

TWIN ENGINE POWER UNITER

CROSS-REFERENCE TO RELATED PATENT APPLICATION

This application claims the benefit of U.S. Provisional Patent Application No. 62/456,413, filed Feb. 8, 2017, which is incorporated herein by reference in its entirety.

BACKGROUND

The present application relates generally to the field of vehicle powertrains. In particular, the present application relates to a vehicle powertrain including a power takeoff output. Fire fighting vehicles, for example Aircraft Rescue Fire Fighting (ARFF) vehicles, are specialized vehicles that transport water and/or fire suppressant foam to the scene of a fire emergency. Most commonly, ARFF vehicles are commissioned for use at an airfield, throughout which the location of an emergency scene (e.g., an airplane crash, etc.) can vary widely, thereby prompting the transport of firefighting materials and personnel to the emergency site. ARFF vehicles are heavy-duty vehicles in nature and are able to respond at high speeds to reach even remote areas of an airfield quickly.

ARFF vehicles include power transmission systems that transfer power from an engine to a driveline that propels the vehicle. ARFF vehicles also typically include pumping systems that provide pressurized supplies of water and/or fire suppressant foam to be discharged onto fires. In certain situations (e.g., driving to an emergency scene), powering the driveline is the highest priority, whereas in other situations (e.g., after having arrived at the emergency scene), powering the pumping system is the highest priority. Conventional ARFF vehicles have a limited ability to change how power is distributed throughout the vehicle depending on the situation.

SUMMARY

One exemplary embodiment relates to a vehicle including a chassis, a driveline coupled to the chassis, an accessory coupled to the chassis and configured to receive rotational mechanical energy, a first driver and a second driver each coupled to the chassis and configured to provide rotational mechanical energy, and a power transmission device. The driveline includes multiple tractive elements and is configured to receive rotational mechanical energy and propel the vehicle. The power transmission device includes a housing coupled to the chassis, a first input shaft rotatably coupled to the housing and configured to receive the rotational mechanical energy from the first driver, a second input shaft rotatably coupled to the housing and configured to receive the rotational mechanical energy from the second driver, a primary output interface rotatably coupled to the housing and coupled to the driveline, a power takeoff shaft rotatably coupled to the housing, radially aligned with the first input shaft, and coupled to the accessory, a first clutch configured to selectively rotationally couple the first input shaft to the primary output interface, and a second clutch configured to selectively rotationally couple the first input shaft to the power takeoff shaft. At least a portion of the rotational mechanical energy from the first driver passes through the first clutch and the primary output interface to the driveline when the first clutch is engaged. At least a portion of the rotational mechanical energy from the first driver passes through the second clutch and the power takeoff shaft to the accessory when the second clutch is engaged.

Another exemplary embodiment relates to a power transmission device including a housing, a first input shaft and a second input shaft each rotatably coupled to the housing, a primary output interface rotatably coupled to the housing, a power takeoff shaft rotatably coupled to the housing, a first clutch configured to selectively rotationally couple the first input shaft to the primary output interface, and a second clutch configured to selectively couple the first input shaft to the power takeoff shaft. At least a portion of a rotational mechanical energy input received by the first input shaft passes through the first clutch to the primary output interface when the first clutch is engaged. At least a portion of the rotational mechanical energy input received by the first input shaft passes through the second clutch to the power takeoff shaft when the second clutch is engaged. The primary output interface is directly rotationally coupled to the second input shaft such that at least a portion of a rotational mechanical energy input received by the second input shaft passes to the primary output interface.

Yet another exemplary embodiment relates to a vehicle including a chassis, a driveline coupled to the chassis, a first driver and a second driver each coupled to the chassis, a power transmission device configured to receive mechanical energy from the first driver and the second driver, and a controller configured to selectively reconfigure the vehicle between a plurality of different modes of operation. The driveline includes multiple tractive elements and is configured to receive mechanical energy and propel the vehicle. The power transmission device includes a first input interface coupled to the first driver, a second input interface coupled to the second driver, a primary output interface coupled to the driveline, a power takeoff interface, a first clutch configured to selectively rotationally couple the first input interface to the primary output interface, and a second clutch configured to selectively rotationally couple the first input interface to the power takeoff interface. The second input interface is rotationally coupled to the primary output interface in all of the modes of operation. In a first one of the modes of operation, the controller is configured to engage the first clutch and disengage the second clutch, thereby configuring the power transmission device to transfer mechanical energy from the first driver to the driveline. In a second one of the modes of operation, the controller is configured to engage the second clutch and disengage the first clutch, thereby configuring the power transmission device to transfer mechanical energy from the first driver to the power takeoff interface.

The invention is capable of other embodiments and of being carried out in various ways. Alternative exemplary embodiments relate to other features and combinations of features as may be recited herein.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes a power transmission device having a first input shaft, a second input shaft, a primary output shaft, and a power takeoff shaft. A multipurpose engine is coupled to the first input shaft through a multipurpose transmission, and a drive engine is coupled to the second input shaft through a drive transmission. The primary output shaft of the power transmission device is coupled to a driveline of the vehicle, and the power takeoff shaft of the power transmission device is coupled to an accessory of the vehicle, such as a pump. The power transmission device directly rotationally couples the second input shaft to the primary output shaft such that a mechanical energy input from the drive engine would drive the driveline in every mode of operation of the vehicle. The power transmission device further includes a drive clutch and a pump clutch that are selectively engaged based on the mode of operation of the fire fighting vehicle. The drive clutch selectively rotationally couples the first input shaft to the primary output shaft, and the pump clutch selectively rotationally couples the first input shaft to the power takeoff shaft. The fire fighting vehicle of the present application operates in various modes including a pump and roll mode (e.g., driving with the pumping system active, etc.) and a dual engine drive mode (e.g., movement with the pumping system off, etc.). In the dual engine drive mode of operation, the drive clutch is engaged and both of the engines are controlled to output a desired torque, thereby providing rotational mechanical energy to the driveline to propel the fire fighting vehicle. In the pump and roll mode, the pump clutch is engaged, the multipurpose engine is controlled to achieve a desired speed, and the drive engine is controlled to output a desired torque, thereby propelling the vehicle while simultaneously pumping fluid.

Figure 1:
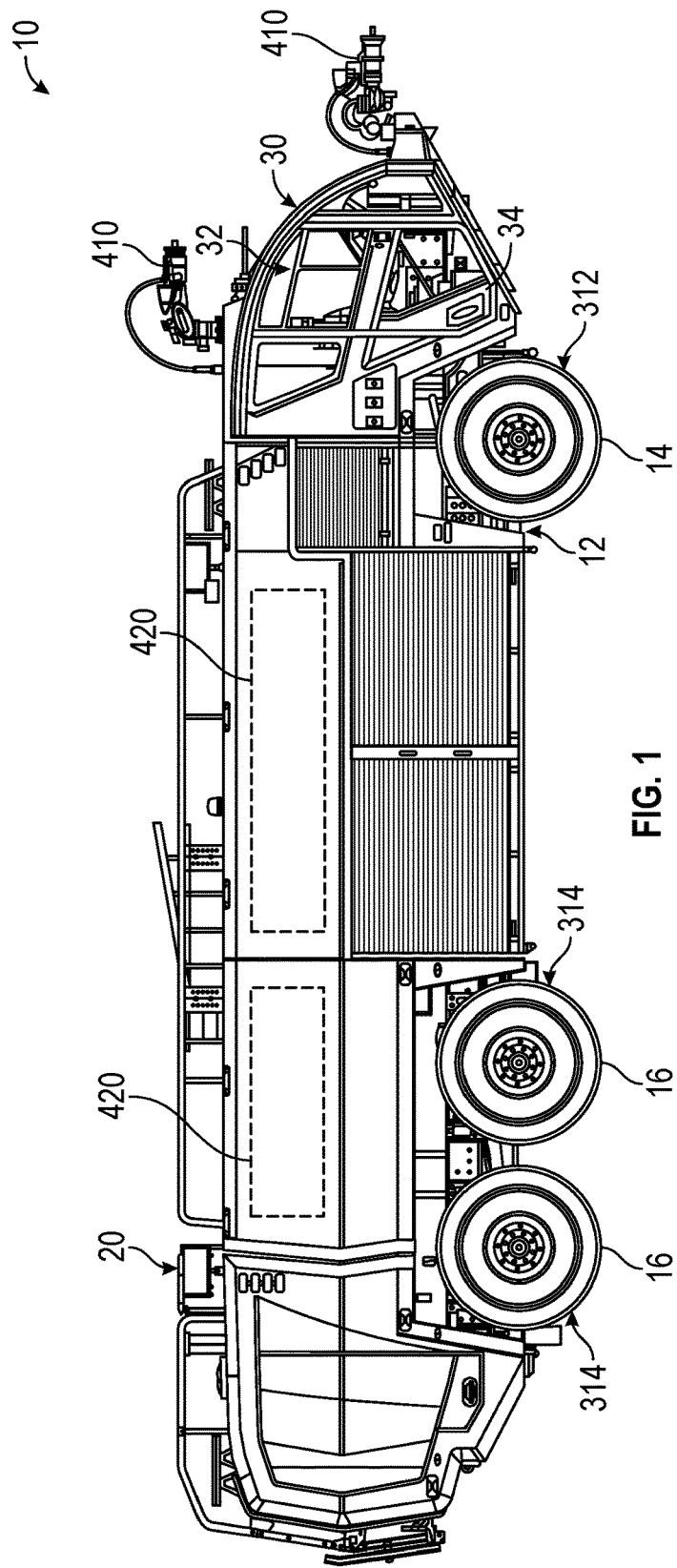
FIG. 1 is a side view of a fire fighting vehicle, according to an exemplary embodiment.
Figure 2:
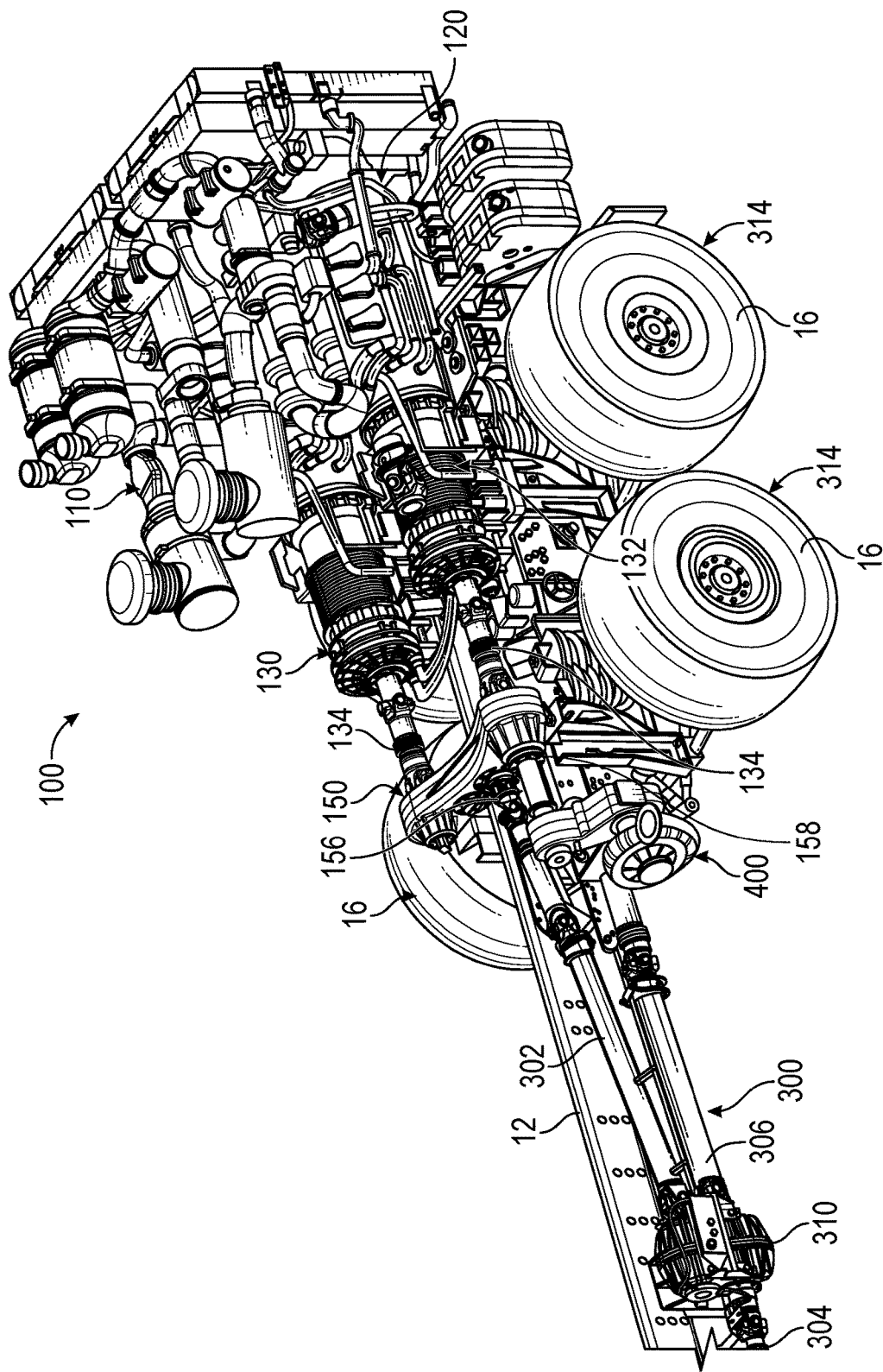
FIG. 2 is a perspective view of a powertrain of the fire fighting vehicle of FIG. 1, according to an exemplary embodiment.
Figure 3:
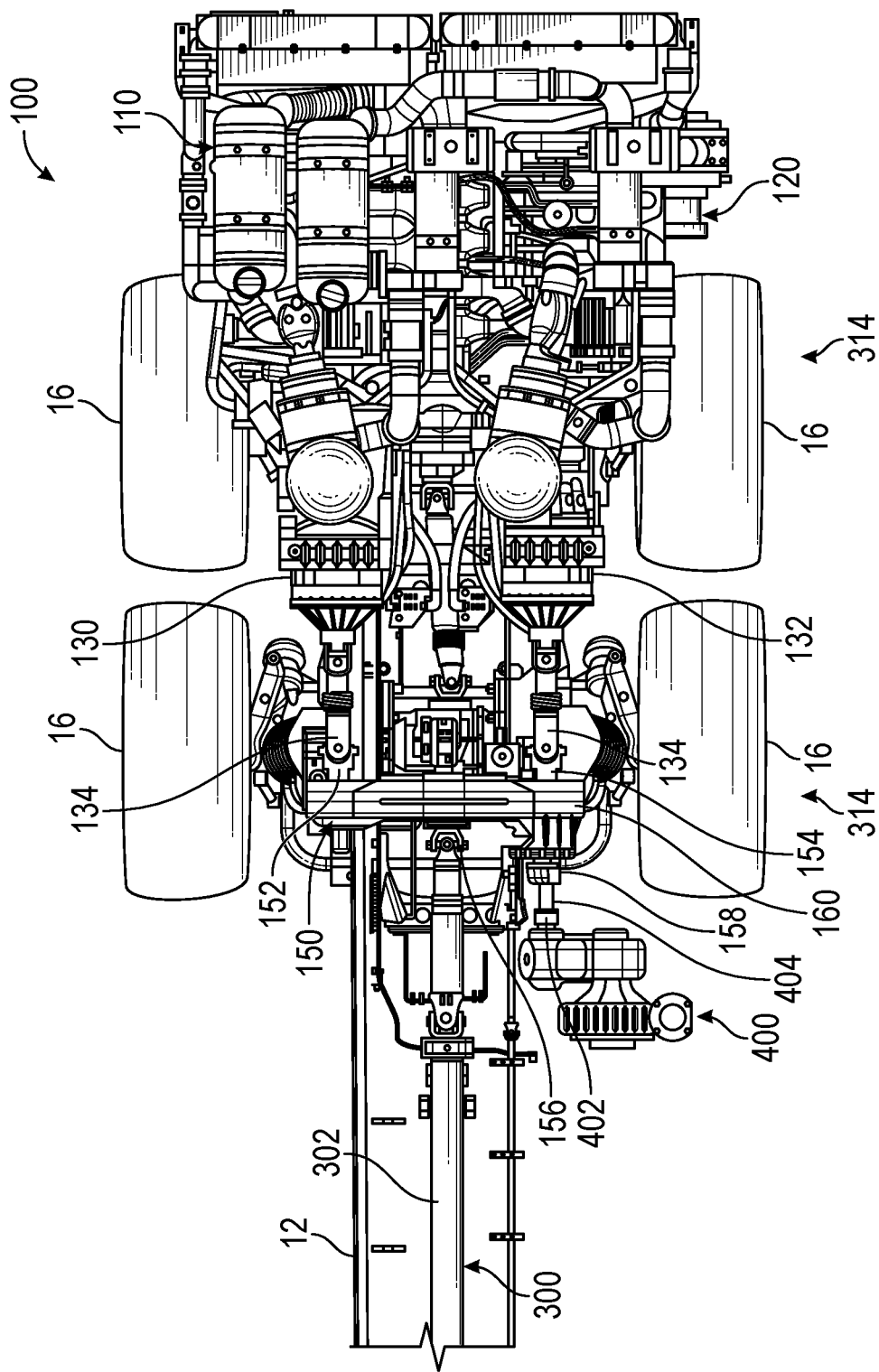
FIG. 3 is a top view of the powertrain of FIG. 2.
Figure 4:
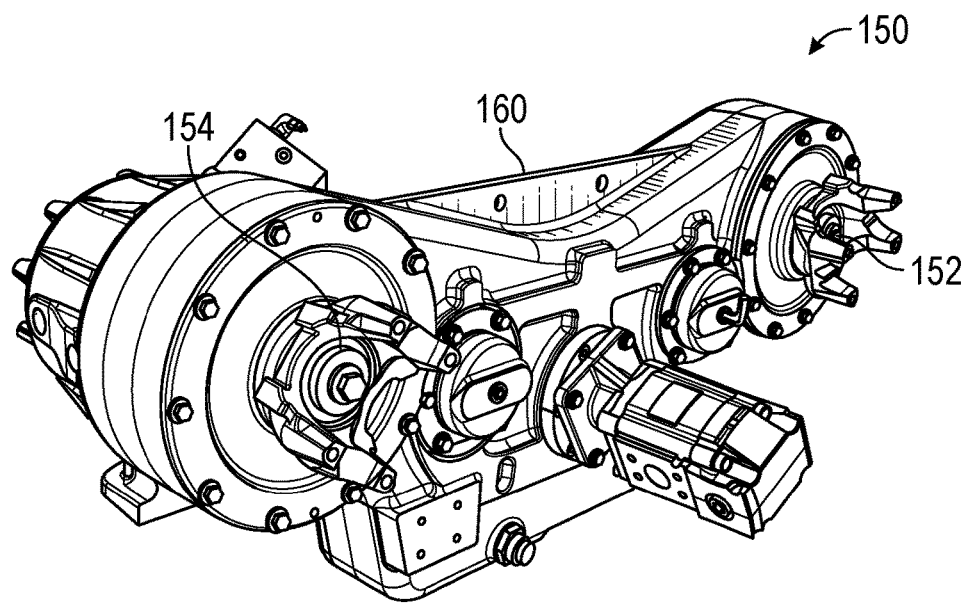
FIG. 4 is a rear perspective view of a power transmission device of the powertrain of FIG. 2, according to an exemplary embodiment.
Figure 5:
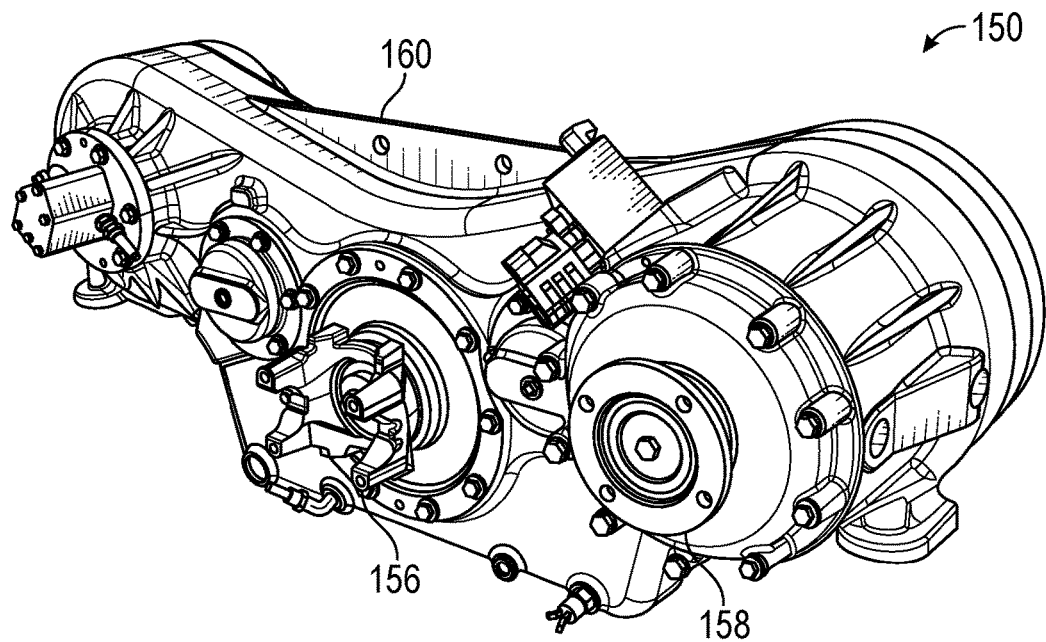
FIG. 5 is a front perspective view of the power transmission device of FIG. 4.

According to the exemplary embodiment shown in FIGS. 1-3, a vehicle, shown as fire apparatus or fire fighting vehicle 10, includes a twin engine powertrain, shown as powertrain 100. According to an exemplary embodiment, the powertrain 100 is configured to propel (e.g., drive, etc.) the fire fighting vehicle 10 in a first mode of operation (e.g., a dual engine drive mode, etc.) and to one or both of propel the fire fighting vehicle 10 and provide (e.g., pump, etc.) a fluid (e.g., water, an agent such as fire suppressant foam, etc.) to aid in extinguishing a fire in a second mode of operation (e.g., a pump and roll mode, etc.). According to the exemplary embodiment shown in FIG. 1, the fire fighting vehicle 10 is an ARFF vehicle. According to alternative embodiments, the fire fighting vehicle 10 is a municipal fire-fighting vehicle, a forest fire apparatus, an aerial truck, a rescue truck, a tanker, or still another type of fire-fighting vehicle. According to still other embodiments, the vehicle is another type of vehicle (e.g., a military vehicle, a commercial vehicle, a cement mixer, a refuse vehicle, a telehandler, a boom truck, etc.) configured to perform another function (e.g., transport troops or cargo, mix cement, compact and transport refuse, lift objects, etc.).

As shown in FIG. 1, the fire fighting vehicle 10 includes a frame, shown as chassis 12. The chassis 12 is supported by a plurality of tractive elements, shown as front wheels 14 and rear wheels 16. The chassis 12 supports a body assembly, shown as a rear section 20, and a cab, shown as front cabin 30. As shown in FIG. 1, the front cabin 30 is positioned forward of the rear section 20 (e.g., with respect to a forward direction of travel for the fire fighting vehicle 10, etc.). According to an alternative embodiment, the front cabin 30 is positioned behind the rear section 20 (e.g., with respect to a forward direction of travel for the fire fighting vehicle 10, etc.). According to an exemplary embodiment, the front cabin 30 includes a plurality of body panels coupled to a support (e.g., a structural frame assembly, etc.). The body panels define a plurality of openings through which an operator accesses (e.g., for ingress, for egress, to retrieve components from within, etc.) an interior 32 of front cabin 30. As shown in FIG. 1, front cabin 30 includes a pair of doors 34 positioned over the plurality of openings defined by the plurality of body panels. The doors 34 provide access to the interior 32 of front cabin 30 for a driver (and/or passengers) of the fire fighting vehicle 10.

Referring to FIGS. 2 and 3, the powertrain 100 includes a first driver, shown as drive engine 110, and a second driver, shown as multipurpose engine 120. According to an exemplary embodiment, the drive engine 110 and the multipurpose engine 120 are compression-ignition internal combustion engines that utilize diesel fuel. In alternative embodiments, one or both of the drive engine 110 and the multipurpose engine 120 is another type of driver (e.g., spark-ignition engine, fuel cell, electric motor, hybrid engine/motor, etc.) that is otherwise powered (e.g., with gasoline, compressed natural gas, hydrogen, electricity from a battery or capacitor, etc.). According to an exemplary embodiment, the drive engine 110 and the multipurpose engine 120 are each capable of providing a power output between 300 and 770 horsepower ("HP") (e.g., 550 horsepower, 670 horsepower, 770 horsepower, etc.). In other embodiments, the drive engine 110 and the multipurpose engine 120 provide a greater or lesser power output. In some embodiments, the power output and/or torque output of the drive engine 110 and the multipurpose engine 120 are the same or similar. In other embodiments, the drive engine 110 and the multipurpose engine 120 have different outputs. In some embodiments, the drive engine 110 and the multipurpose engine 120 are the same variant (e.g., model, configuration, etc.) of engine (e.g., a Scania DC 16, etc.).

The chassis 12 supports (e.g., is coupled to) both the drive engine 110 and the multipurpose engine 120. Although the chassis 12 is shown with a single rail extending longitudinally, it should be understood that the chassis 12 may include additional longitudinally or laterally extending members. According to the exemplary embodiment shown in FIGS. 2 and 3, the fire fighting vehicle 10 is a rear engine vehicle (i.e., the drive engine 110 and the multipurpose engine 120 are both located in the rear section 20). In other embodiments, one or both of the drive engine 110 and the multipurpose engine 120 are located elsewhere in the fire fighting vehicle 10. By way of example, the drive engine 110 and the multipurpose engine 120 may be located near the front of the fire fighting vehicle 10 (e.g., beneath the front cabin 30). By way of another example, the drive engine 110 may be located near the middle of the fire fighting vehicle 10 and the multipurpose engine 120 may be located near the rear end of the fire fighting vehicle 10.

According to an exemplary embodiment, the drive engine 110 and the multipurpose engine 120 use stored energy (e.g., through the combustion of gasoline or diesel fuel, by discharging energy stored within a battery or capacitor, etc.) and output rotational mechanical energy. The mechanical energy provided by the drive engine 110 and the multipurpose engine 120 passes through a pair of gearboxes or power transmission devices, shown as drive transmission 130 and multipurpose transmission 132, respectively. The drive transmission 130 and the multipurpose transmission 132 may receive rotational mechanical energy from the drive engine 110 and the multipurpose engine 120 at first speeds and output rotational mechanical energy at greater or lesser speeds than the first speeds. The drive transmission 130 and the multipurpose transmission 132 may be configured to shift between a number of different gears, each with a different gear ratio between inputs and outputs thereof. The drive transmission 130 and the multipurpose transmission 132 are coupled to the drive engine 110 and the multipurpose engine 120, respectively. The drive transmission 130 and the multipurpose transmission 132 may be manual transmissions or automatic transmissions. In some embodiments, the drive transmission 130 and the multipurpose transmission 132 are electronically actuated such that shifting occurs in response to an electrical signal being received from another source (e.g., from the controller 510, etc.). In some embodiments, both the drive transmission 130 and the multipurpose transmission 132 are the same variant (e.g., model, configuration, etc.) of transmission (e.g., an Allison 4800 EVS, an Allison 4850 EVS, etc.).

Referring to FIGS. 2-7, mechanical energy flows from the outputs of the drive transmission 130 and the multipurpose transmission 132 to a gearbox or power transmission device, shown as power uniter 150, through a pair of shafts, shown as drive shafts 134. Accordingly, the power uniter 150 is indirectly coupled to the drive engine 110 and the multipurpose engine 120 through the drive transmission 130, the multipurpose transmission 132, and the drive shafts 134. The power uniter 150 receives mechanical energy from the drive engine 110 through a first input interface, shown as drive input 152, and receives rotational mechanical energy from the multipurpose engine 120 through a second input interface, shown as multipurpose input 154. The drive input 152 and the multipurpose input 154 may be coupled to their respective drive shafts 134 though a universal joint and/or a constant velocity (CV) joint to facilitate nonalignment between the drive input 152 and the multipurpose input 154 of the power uniter 150 and the drive transmission 130 and the multipurpose transmission 132, respectively. The power uniter 150 includes two outputs: a primary output interface, shown as drive output 156, and a secondary output interface, shown as power takeoff interface 158 (e.g., a pump output, etc.). The input interfaces and output interfaces may be any interface configured to couple to another input or output. By way of example, the drive input 152 may be an extension configured to couple to a universal joint of the drive shaft 134. By way of another example, the power takeoff interface 158 may define a keyed or splined aperture configured to receive a corresponding keyed or splined shaft. The power uniter 150 further includes an enclosure, shown as housing 160, that provides an external structure configured to house (e.g., contain, enclose, etc.) the various components of the power uniter 150. The housing 160 is coupled (e.g., fastened, welded, etc.) to the chassis 12.

Figure 7:
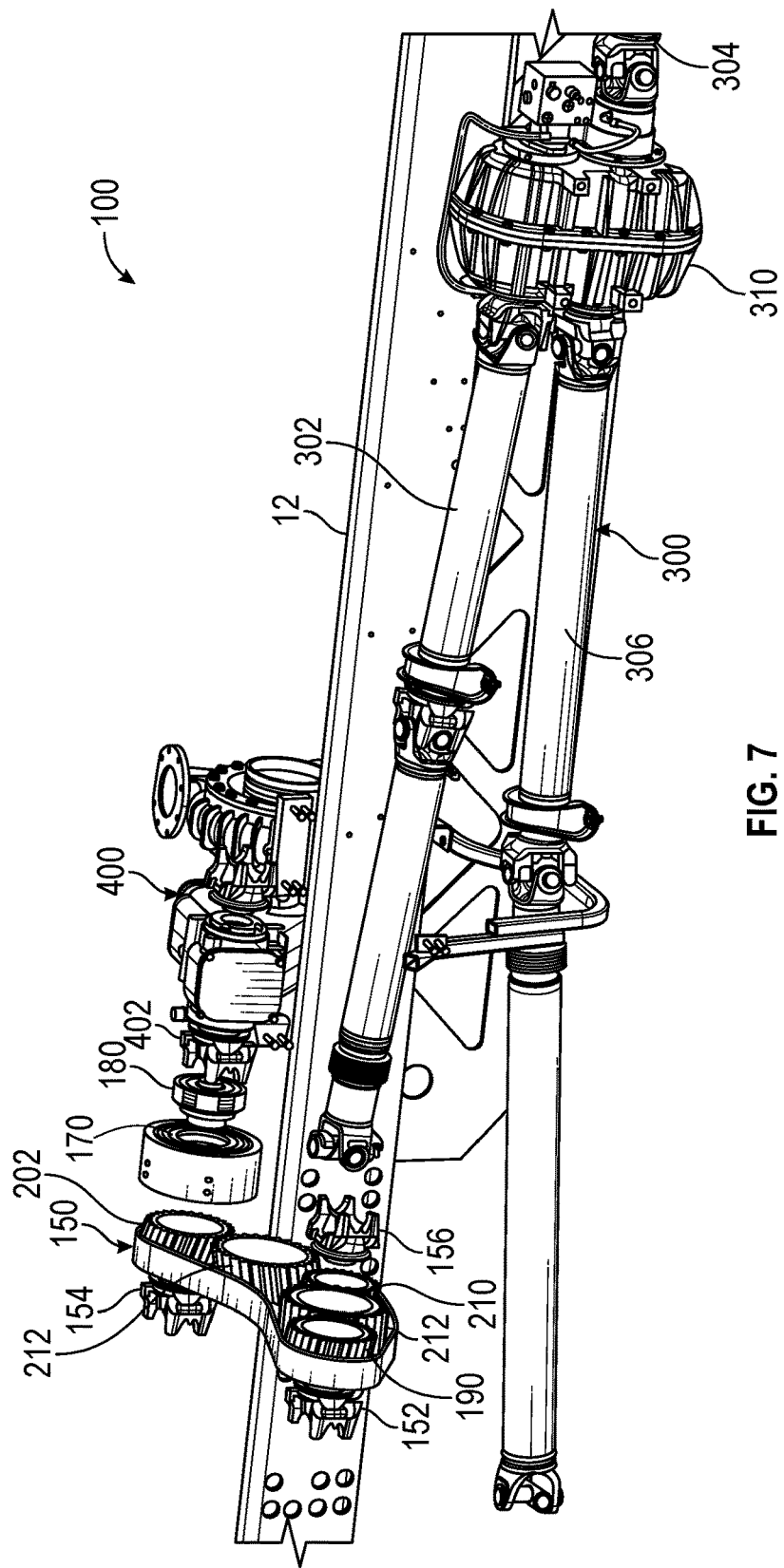
FIG. 7 is an exploded view of the powertrain of FIG. 2.
Figure 8:
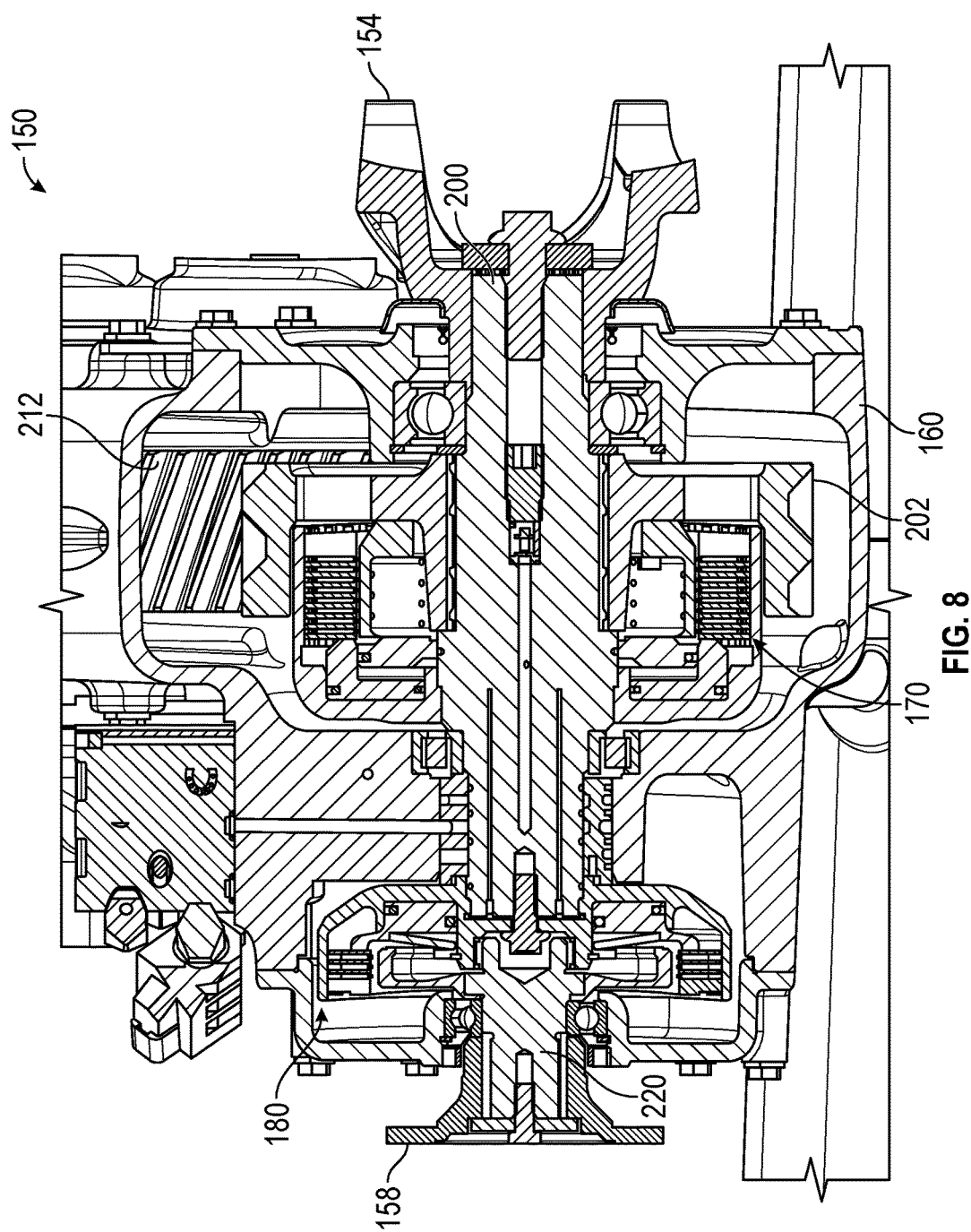
FIG. 8 is a section view of the power transmission device of FIG. 4.
Figure 9:
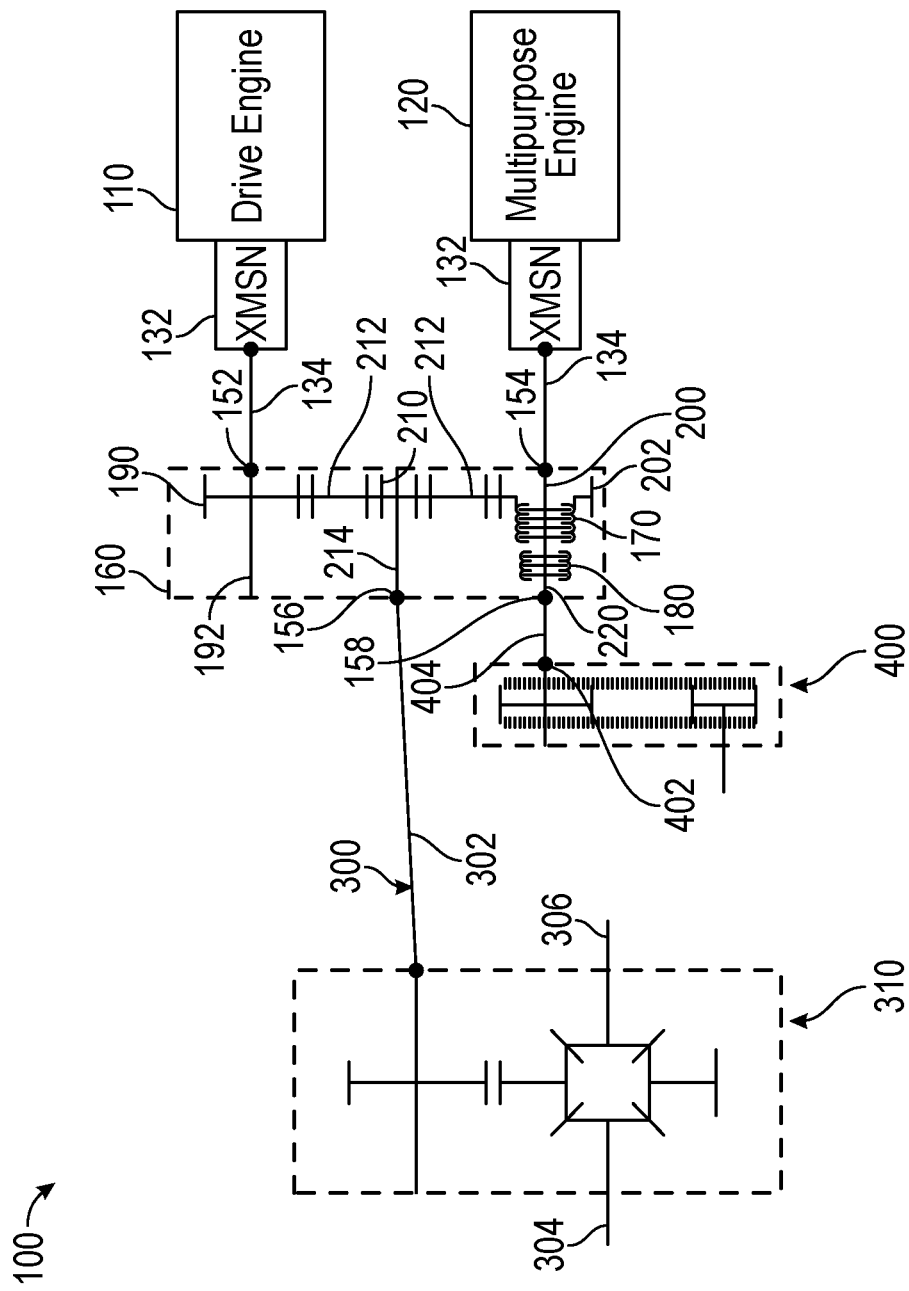
FIG. 9 is a schematic view of the powertrain of FIG. 2.

As shown in FIGS. 7-9, the power uniter 150 includes a first clutch, shown as drive clutch 170, and a second clutch, shown as pump clutch 180. The drive clutch 170 is configured to selectively rotationally couple the multipurpose input 154 to the drive output 156. The pump clutch 180 is configured to selectively rotationally couple the multipurpose input 154 to the power takeoff interface 158. The drive clutch 170 and the pump clutch 180 selectively transfer mechanical energy from the multipurpose input 154 to the drive output 156 or the power takeoff interface 158. In the embodiment shown in FIG. 7, the drive input 152 is directly rotationally coupled to the drive output 156 without a clutch, such that mechanical energy from the drive input 152 is transferred to the drive output 156 regardless of the mode of operation (i.e., in every mode of operation) of the fire fighting vehicle 10. In alternative embodiments, the drive input 152 is selectively coupled to the drive output 156 with a third clutch. The clutches may be actuated (e.g., engaged, disengaged, etc.) in a variety of ways (e.g., using magnetic force, pneumatic force, spring force, hydraulic force, etc.). In some embodiments, the drive clutch 170 and the pump clutch 180 are activated (i.e., engaged, closed) by applying a hydraulic pressure through one or more ports defined in the housing 160 and deactivated (i.e., disengaged, opened) by a spring bias.

Figure 10:
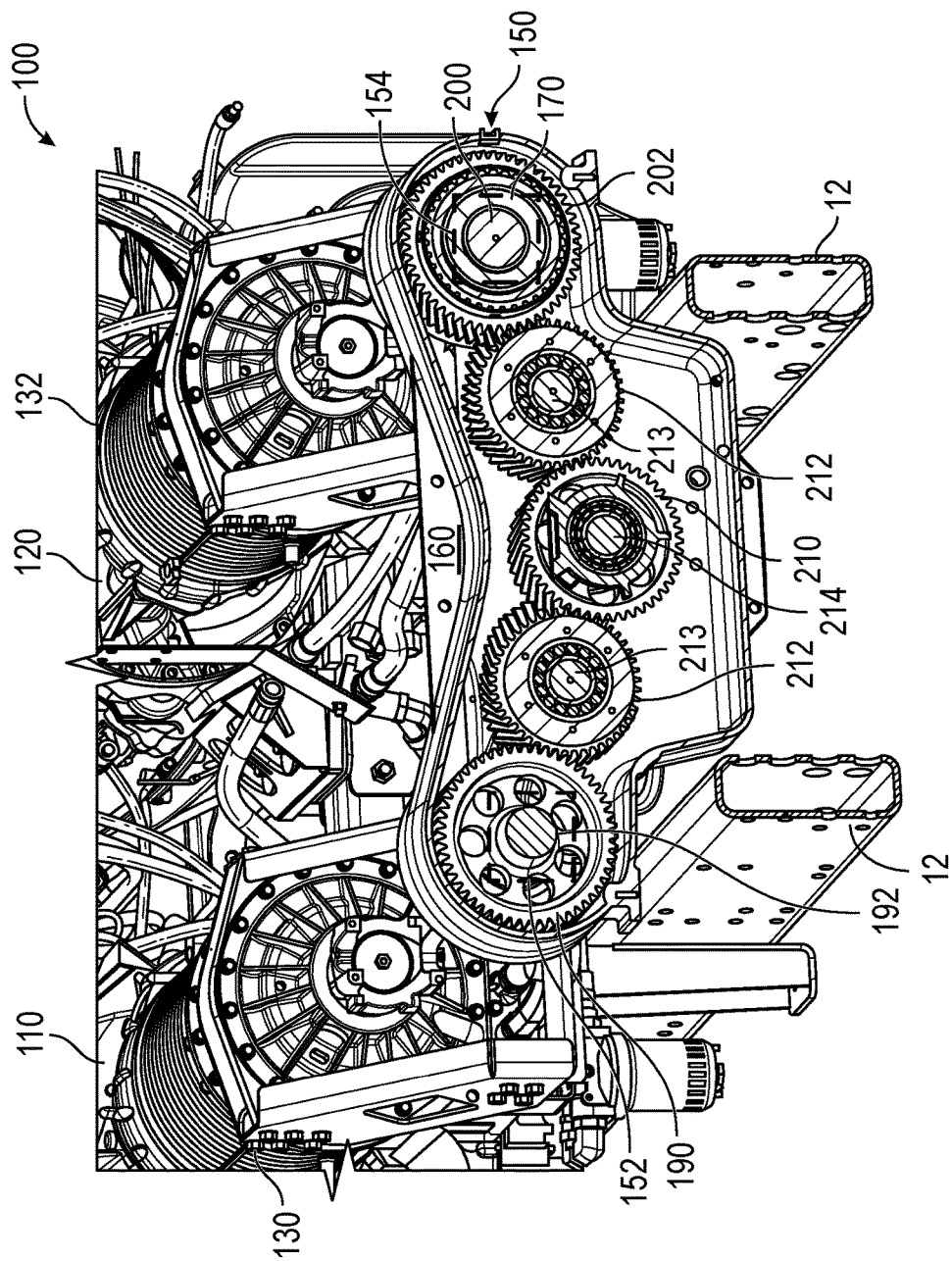
FIG. 10 is a section view of the powertrain of FIG. 2.

Referring to FIGS. 8-10, the drive input 152 is connected to a first gear, shown as drive input gear 190. The drive input 152 is part of (e.g., is included within, is integrally formed with other components of, is rotationally and/or fixedly coupled with other components of, etc.) a first input shaft, shown as drive input shaft 192, which is directly and fixedly coupled to the drive input gear 190 and rotatably coupled to the housing 160. The drive input gear 190 and the drive input shaft 192 are radially aligned, such that the drive input gear 190 rotates with the drive input 152. The multipurpose input 154 is part of a second input shaft, shown as multipurpose input shaft 200, which is rotatably coupled to the housing 160. The multipurpose input shaft 200 is selectively coupled to a second gear, shown as multipurpose gear 202, by the drive clutch 170. The multipurpose input shaft 200, the multipurpose gear 202, and the drive clutch 170 are radially aligned, such that the multipurpose gear 202 rotates with the multipurpose input 154 when the drive clutch 170 is engaged. The drive input gear 190 and the multipurpose gear 202 are rotationally coupled to a third gear, shown as drive output gear 210, by a pair of gears, shown as idler gears 212. Specifically, the drive input gear 190 and the multipurpose gear 202 each engage an idler gear 212, which in turn engages the drive output gear 210. Accordingly, the drive input gear 190, the multipurpose gear 202, the drive output gear 210, and the idler gears 212 are all directly rotationally coupled with one another. The idler gears 212 are rotatably coupled to the housing 160 through a pair of shafts 213 that are fixedly coupled to the housing 160. The idler gears 212 may include bushings or bearings to facilitate free rotation relative to the housing 160. The drive output 156 is part of a primary output shaft, shown as drive output shaft 214, which is directly and fixedly coupled to the drive output gear 210 and rotatably coupled to the housing 160. The drive output shaft 214 and the drive output gear 210 are radially aligned such that the drive output 156 rotates with the drive output gear 210.

The drive input shaft 192 is radially offset a first distance from the multipurpose input shaft 200. The drive output shaft 214 is radially offset a second distance from the multipurpose input shaft 200 that is smaller than the first distance. Accordingly, the drive output shaft 214 is positioned laterally between the drive input shaft 192 and the multipurpose input shaft 200. In some embodiments, the drive output shaft 214 is positioned along a longitudinal centerline of the fire fighting vehicle 10. The idler gears 212 facilitate spacing the drive input 152 and the multipurpose input 154 apart from one another (e.g., without modifying the diameters of the drive input gear 190, the multipurpose gear 202, and/or the drive output gear 210, etc.). The number and diameter of the idler gears 212 may be varied to vary the distances between the drive input 152, the multipurpose input 154, and the drive output 156. In some embodiments, one or more of the idler gears 212 are omitted, and one or both of the multipurpose gear 202 and the drive input gear 190 directly engage the drive output gear 210.

Referring to FIGS. 8 and 9, the power takeoff interface 158 is part of a secondary output shaft, shown as power takeoff shaft 220, which is rotatably coupled to the housing 160. The pump clutch 180 is directly coupled to and selectively couples the multipurpose input shaft 200 and the power takeoff shaft 220. The power takeoff shaft 220 is radially aligned with the multipurpose input shaft 200 and the pump clutch 180, such that the multipurpose input 154 rotates with the power takeoff interface 158 when the pump clutch 180 is engaged.

Figure 11:
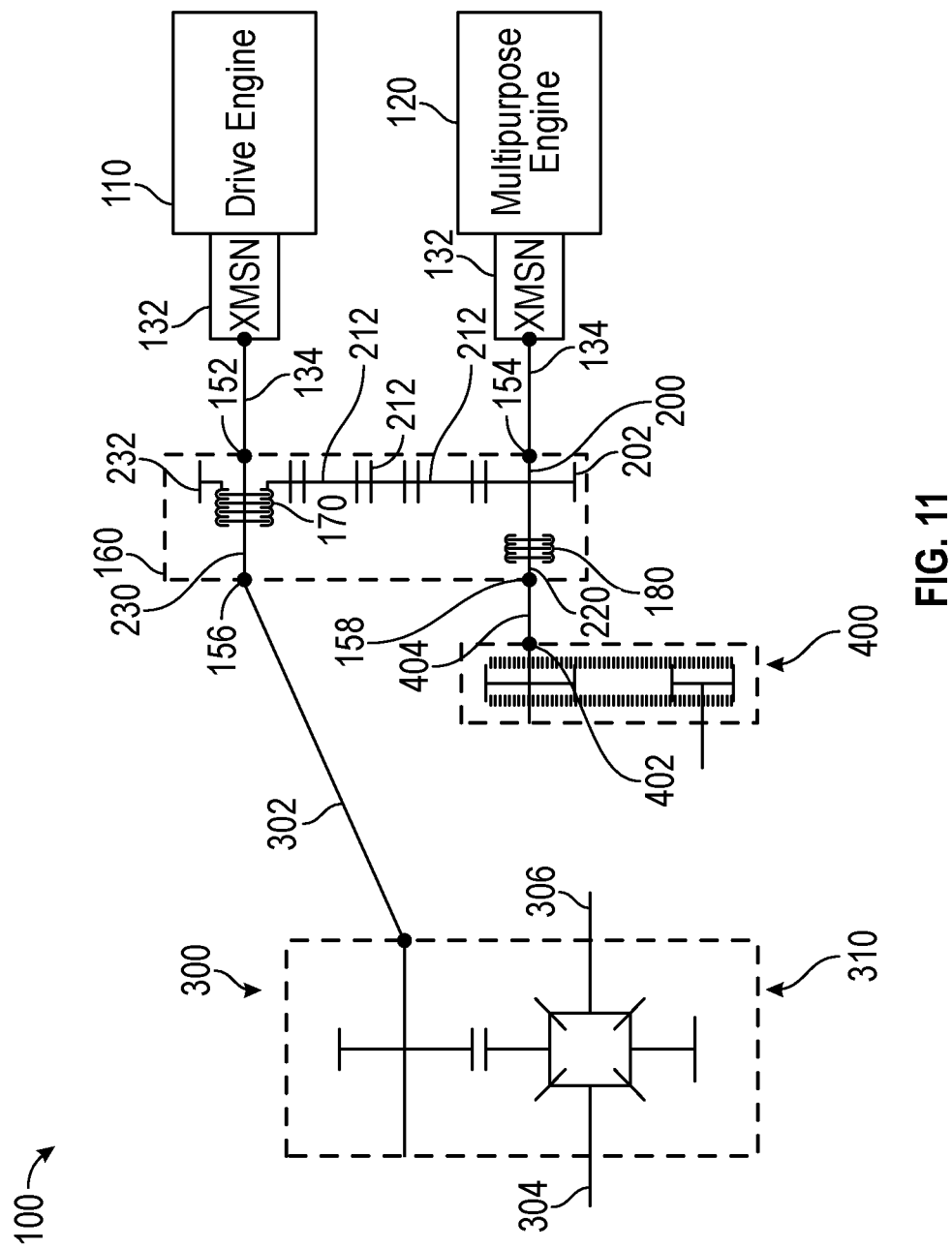
FIG. 11 is a schematic view of a powertrain of the fire fighting vehicle of FIG. 1, according to another exemplary embodiment.

In an alternative embodiment, shown in FIG. 11, the drive input shaft 192 and the drive output shaft 214 are combined into a single, continuous drive shaft 230 such that the drive input 152 is radially aligned with the drive output 156. In this embodiment, the drive clutch 170 is relocated to be radially aligned with the drive shaft 230. The drive clutch 170 selectively couples the drive shaft 230 to a gear, shown as drive gear 232, that is radially aligned with the drive shaft 230. The multipurpose gear 202 is directly and fixedly coupled to the multipurpose input shaft 200. A series of idler gears 212 couple the multipurpose gear 202 to the drive gear 232. In a further alternative embodiment, the drive clutch 170 is again radially aligned with the multipurpose input shaft 200 and configured to selectively couple the multipurpose gear 202 to the multipurpose shaft, and the drive gear 232 is directly and fixedly coupled to the drive shaft 230. These alternative embodiments function similarly to the embodiment shown in FIG. 9 in that: (a) the drive input 152 is directly rotationally coupled to the drive output 156 (e.g., through the drive shaft 230), (b) the multipurpose input 154 is selectively coupled to the drive output 156 with the drive clutch 170, and (c) the multipurpose input 154 is selectively coupled to the power takeoff interface 158 with the pump clutch 180.

Figure 6:
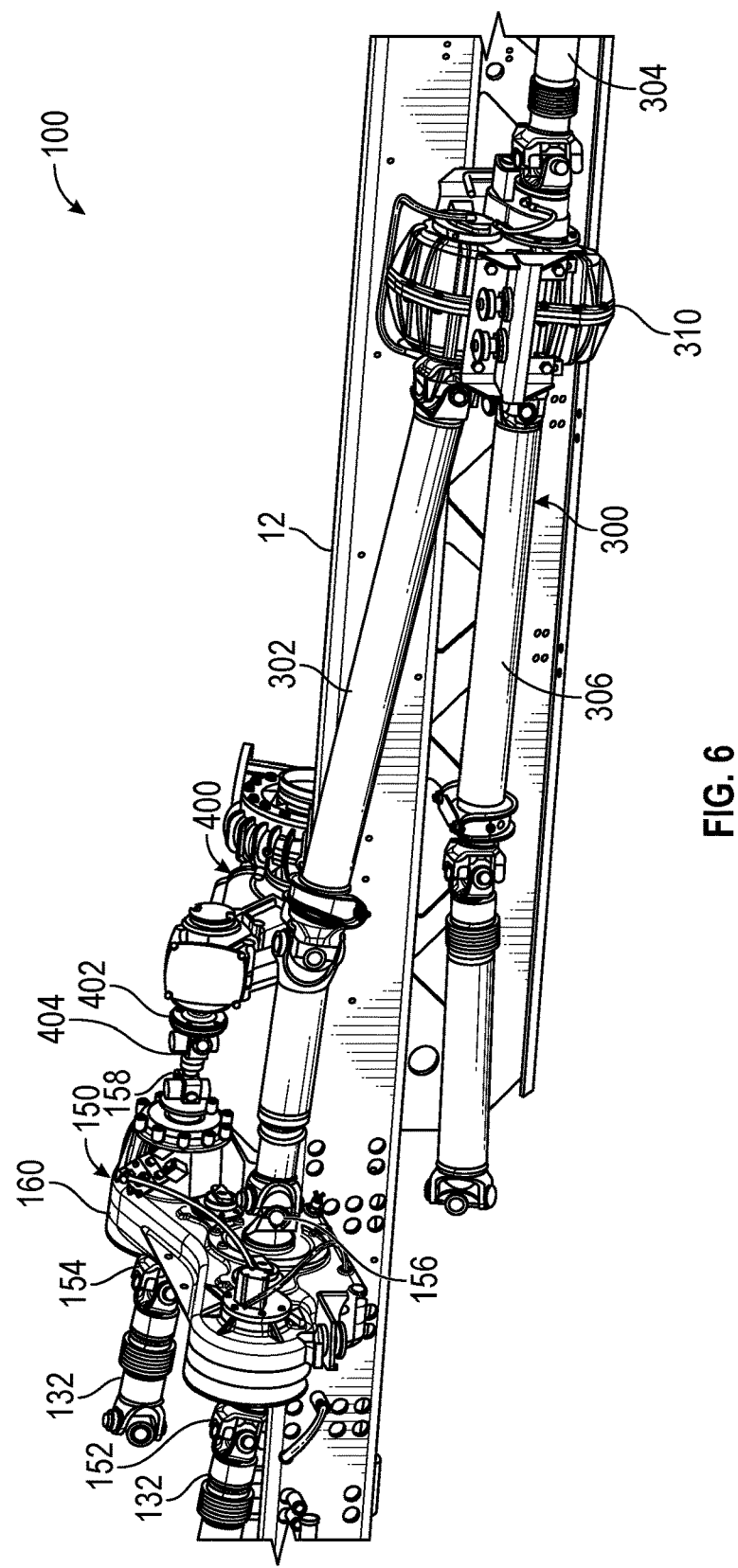
FIG. 6 is a perspective view of the powertrain of FIG. 2.

As shown in FIG. 6, the drive output 156 of the power uniter 150 provides a rotational mechanical energy output to a drivetrain or driveline, shown as driveline 300. The driveline 300 is coupled to the chassis 12 and configured to propel the fire fighting vehicle 10. The driveline 300 includes a first drive shaft, shown as drive shaft 302, a second drive shaft, shown as forward drive shaft 304, and a third drive shaft, shown as rear drive shaft 306. The drive output 156 is directly coupled to the drive shaft 302, which in turn is coupled to a gearbox or power transmission device, shown as transfer case 310. The drive shaft 302 provides rotational mechanical energy from the drive output 156 to the transfer case 310. The transfer case 310 is coupled to the forward drive shaft 304 and the rear drive shaft 306. As shown in FIGS. 1, 2, and 6, the transfer case 310 provides a portion of the mechanical energy it receives to one or more front axles, shown as front axle assemblies 312, through the forward drive shaft 304 and to one or more rear axles, shown as rear axle assemblies 314, through the rear drive shaft 306. The transfer case 310 may have a higher load rating than that of a transfer case for a similarly-sized traditional vehicle in order to accommodate an increased loading applied by two engines. Gearing inside the transfer case 310 may be selected to vary the gear ratio between the drive output 156 and the outputs of the transfer case 310.

The front axle assemblies 312 include the front wheels 14, and the rear axle assemblies 314 include the rear wheels 16. The front axle assemblies 312 and rear axle assemblies 314 may each include one or more suspension assemblies coupling the front axle assemblies 312 and rear axle assemblies 314 to the chassis 12, a differential to distribute mechanical energy from the respective drive shaft to the front wheels 14 or the rear wheels 16, and/or one or more steering assemblies configured to steer the fire fighting vehicle 10. As shown in FIG. 1, the fire fighting vehicle 10 is a 6×6 variant having one front axle assembly 312 and two rear axle assemblies 314. In other embodiments, the fire fighting vehicle 10 may have more or fewer front axle assemblies 312 and/or rear axle assemblies 314. By way of example, the fire fighting vehicle 10 may be an 8×8 variant having two front axle assemblies 312 and two rear axle assemblies 314. By way of another example, the fire fighting vehicle 10 may be a 4×4 variant having one front axle assembly 312 and one rear axle assembly 314.

As shown in FIGS. 3, 6, and 7, the power takeoff interface 158 is coupled to an input interface, shown as pump input 402, of an implement or accessory, shown as pump 400, through a drive shaft, shown as power takeoff drive shaft 404. The pump 400 is coupled to the chassis 12. The pump 400 receives rotational mechanical energy from the power takeoff interface 158 and in response provides (e.g., pump, etc.) a flow of fluid (e.g., water, an agent such as fire suppressant foam, etc.) at an increased pressure for discharging to extinguish a fire. The pump 400 may include any type of pump (e.g., a centrifugal pump, a fixed displacement pump, a variable displacement pump, etc.). As shown in FIG. 1, the fire fighting vehicle 10 includes nozzles, shown as monitors 410, that are fluidly coupled to an output of the pump 400 and configured to direct the fluid in a stream towards a fire. Additionally or alternatively, the fire fighting vehicle 10 may include other types of nozzles, such as piercing nozzles used to penetrate a hull of an aircraft. As shown in FIG. 1, the fire fighting vehicle 10 includes tanks, shown as tanks 420, that are fluidly coupled to an inlet of the pump 400 and configured to contain a volume of fluid. In some embodiments, the pump 400 receives fluid from an outside source (e.g., a tanker truck, a fire hydrant, a body of water, etc.).

In other embodiments, the power takeoff interface 158 provides mechanical energy to a different variety of implement. By way of example, the power takeoff interface 158 may provide mechanical energy to a hydraulic pump or compressor that in turn provides a pressurized fluid to power an implement. The pressurized fluid may be used to actuate one or more hydraulic cylinders and/or motors. By way of example, the powertrain 100 may be used with a refuse vehicle, and fluid pressurized by the power takeoff interface 158 may power a refuse compactor onboard the vehicle. By way of another example, the powertrain 100 may be used with a fire apparatus including an aerial assembly, and fluid pressurized by the power takeoff interface 158 may power hydraulic cylinders and motors that extend and rotate the aerial assembly. Alternatively, the rotational mechanical energy from the power takeoff interface 158 may be used to power an implement directly. By way of example, the powertrain 100 may be used with a utility tractor, and the power takeoff interface 158 may provide rotational mechanical energy to a blade of a lawnmower.

Referring to FIG. 9, the powertrain 100 is configured such that rotational mechanical energy flows from the drive engine 110, through the drive transmission 130, the drive shaft 134, the drive input shaft 192, the drive input gear 190, an idler gear 212, the drive output gear 210, and the drive output shaft 214 to the driveline 300. With the drive clutch 170 engaged, rotational mechanical energy flows from the multipurpose engine 120, through the multipurpose transmission 132, the drive shaft 134, the multipurpose input shaft 200, the drive clutch 170, the multipurpose gear 202, an idler gear 212, the drive output gear 210, and the drive output shaft 214 to the driveline 300. With the pump clutch 180 engaged, rotational mechanical energy flows from the multipurpose engine 120, through the multipurpose transmission 132, the drive shaft 134, the multipurpose input shaft 200, the pump clutch 180, the power takeoff shaft 220, and the power takeoff drive shaft 404 to the pump 400. A portion of the rotational mechanical energy from the engines may be lost (e.g., to friction) as it is transferred.

Referring to FIG. 3, the housing 160 has a front side facing toward the front end of the fire fighting vehicle 10 and a rear side facing opposite the front side toward the rear end of the fire fighting vehicle 10. The drive engine 110, the multipurpose engine 120, the drive transmission 130, the multipurpose transmission 132, and the drive shafts 134 extend rearward of the rear side of the housing 160. To facilitate attachment to these components, the drive input 152 and the multipurpose input 154 are positioned along the rear side of the housing 160. The transfer case 310 and the pump 400 are positioned forward of the front side of the housing 160. To facilitate attachment to these components, the drive output 156 and the power takeoff interface 158 are positioned along the front side of the housing 160. As shown in FIGS. 6-10, the gears (e.g., the drive input gear 190, the multipurpose gear 202, the drive output gear 210, and the idler gears 212) and the clutches (e.g., the drive clutch 170 and the pump clutch 180) are positioned longitudinally between the input interfaces (e.g., the drive input 152 and the multipurpose input 154) and the output interfaces (e.g., the drive output 156 and the power takeoff interface 158) in order to remain within the housing 160. By way of example, the multipurpose input 154 extends on a rear side (e.g., rearward) of the multipurpose gear 202, the drive clutch 170, and the pump clutch 180, and the power takeoff interface 158 extends on a front side (e.g., forward) of the multipurpose gear 202, the drive clutch 170, and the pump clutch 180. By way of another example, the drive input 152 extends on a rear side of the drive input gear 190 and the drive output gear 210, and the drive output 156 extends on a front side of the drive input gear 190 and the drive output gear 210.

Figure 12:
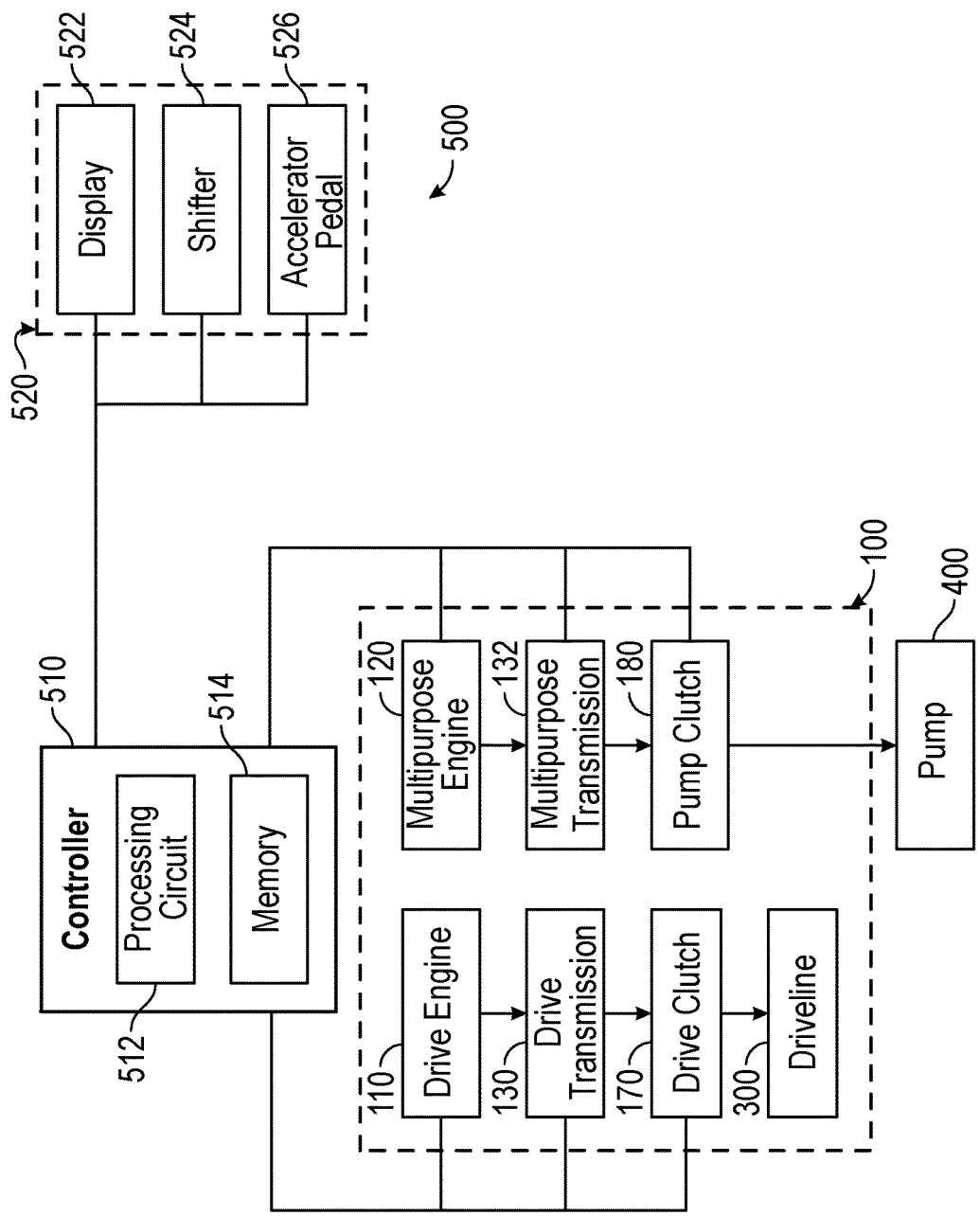
FIG. 12 is a block diagram of a control system of the fire fighting vehicle of FIG. 1, according to an exemplary embodiment.

According to the exemplary embodiment shown in FIG. 12, a control system 500 for a vehicle (e.g., the fire fighting vehicle 10, etc.) includes a controller 510. In one embodiment, the controller 510 is configured to selectively engage, selectively disengage, control, or otherwise communicate with components of the fire fighting vehicle 10 according to various modes of operation. The controller 510 is operatively coupled to the drive engine 110, the multipurpose engine 120, the drive transmission 130, the multipurpose transmission 132, the drive clutch 170, the pump clutch 180, and a user interface 520. In some embodiments, the controller 510 is additionally coupled to the pump 400. The controller 510 may be configured to selectively control the speed and/or torque of the drive engine 110 and/or the multipurpose engine 120 (e.g., interface with a throttle of, etc.), shifting of the drive transmission 130 and the multipurpose transmission 132 (e.g., interface with the electronic shifting mechanism of, etc.), and/or the activation of the drive clutch 170 and/or the pump clutch 180 (e.g., interface with a valve to deploy pressurized hydraulic oil to, etc.). By way of example, the controller 510 may send and receive signals with the drive engine 110, the multipurpose engine 120, the drive transmission 130, the multipurpose transmission 132, the drive clutch 170, the pump clutch 180, the pump 400, and the user interface 520.

The controller 510 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The controller 510 includes a processing circuit 512 and a memory 514. Processing circuit 512 may include an ASIC, one or more FPGAs, a DSP, circuits containing one or more processing components, circuitry for supporting a microprocessor, a group of processing components, or other suitable electronic processing components. In some embodiments, processing circuit 512 is configured to execute computer code stored in memory 514 to facilitate the activities described herein. Memory 514 may be any volatile or non-volatile computer-readable storage medium capable of storing data or computer code relating to the activities described herein. According to an exemplary embodiment, memory 514 includes computer code modules (e.g., executable code, object code, source code, script code, machine code, etc.) configured for execution by processing circuit 512. Memory 514 includes various actuation profiles corresponding to modes of operation (e.g., for the drive engine 110, for the multipurpose engine 120, for the drive transmission 130, for the multipurpose transmission 132, for the drive clutch 170, for the pump clutch 180, for the fire fighting vehicle 10, etc.), according to an exemplary embodiment. In some embodiments, controller 510 may represent a collection of processing devices (e.g., servers, data centers, etc.). In such cases, processing circuit 512 represents the collective processors of the devices, and memory 514 represents the collective storage devices of the devices.

As shown in FIG. 12, the control system 500 includes the user interface 520. The user interface 520 may be located within the interior 32 of the front cabin 30, on the exterior of the fire fighting vehicle 10, and/or on a portable device. The user interface 520 includes a display, shown as display 522, a first control, shown as gear shifter or shifter 524, and a second control, shown as accelerator pedal 526. In some embodiments, the user interface 520 further includes touchscreens, a steering wheel, a brake pedal, and various controls (e.g., buttons, switches, knobs, levers, etc.), among other components. The user interface 520 provides the operator with control capabilities over the fire fighting vehicle 10 (e.g., direction of travel, speed, etc.), one or more components of the pump 400 (e.g., a turret, a pump flow rate, a flow control valve, a system for aiming the monitors 410, etc.), a different type of implement, and/or still other components of the fire fighting vehicle 10 from within the front cabin 30 and/or outside of the fire fighting vehicle 10.

Figure 13:
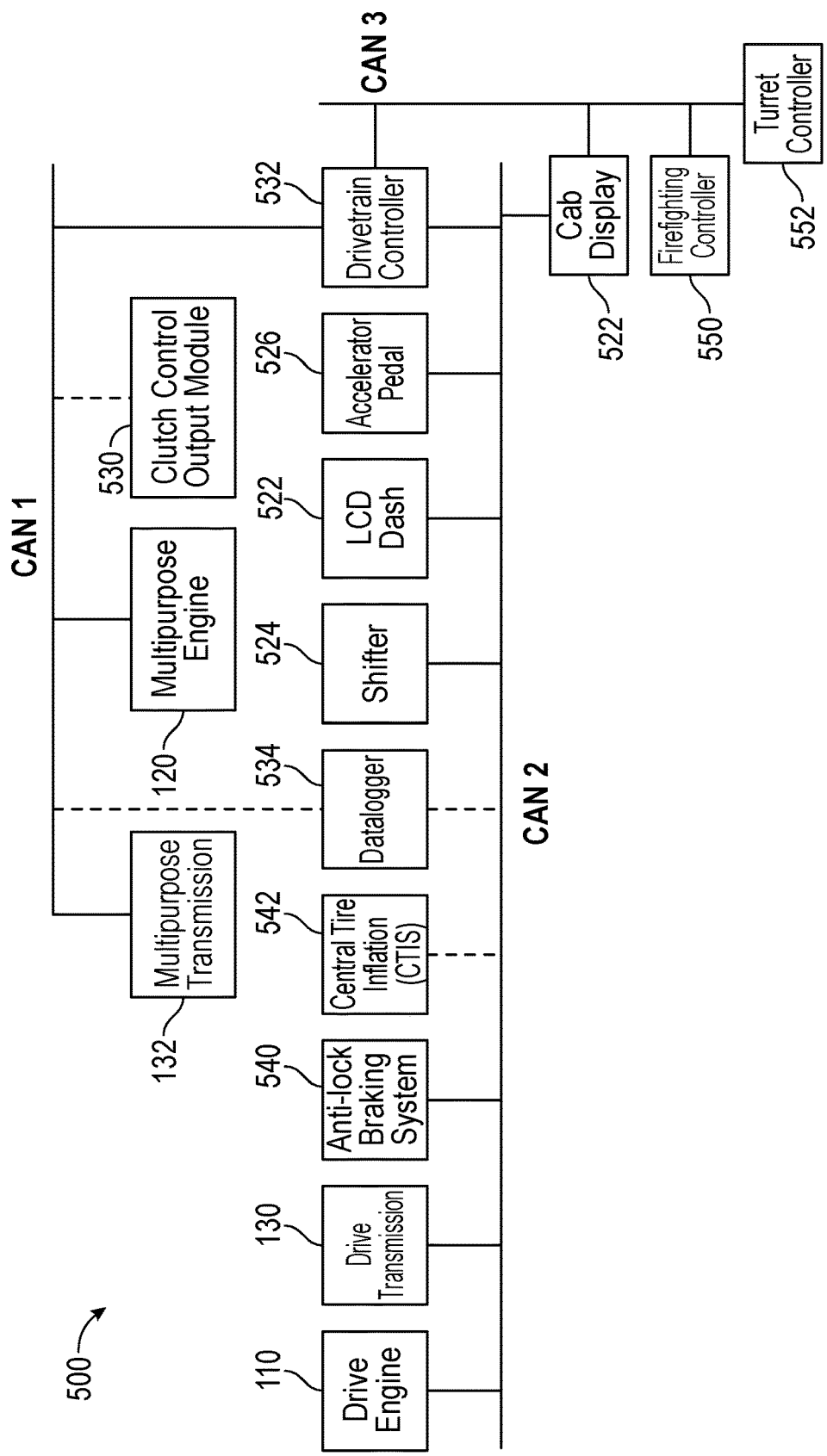
FIG. 13 is another block diagram of the control system of FIG. 12.

Referring to FIG. 13, a specific connection arrangement of the control system 500 is shown. In this arrangement, various components of the fire fighting vehicle 10 communicate over separate controller area network (CAN) databuses. A first CAN bus (CAN 1) is operatively coupled to the multipurpose engine 120, the multipurpose transmission 132, a clutch control output module 530 of the controller 510 that controls engagement and disengagement of the drive clutch 170 and the pump clutch 180, a drivetrain controller 532 of the controller 510, and a datalogger 534 of the controller 510. A second CAN bus (CAN 2) is operatively coupled to the drive engine 110, the drive transmission 130, an anti-lock braking system 540, a central tire inflation system (CTIS) 542, the shifter 524, an LCD dashboard of the display 522, the accelerator pedal 526, the drivetrain controller 532, the datalogger 534, and a cab display of the display 522. CAN 1 and CAN 2 are separated in order to isolate the communication of components used to propel the vehicle from the communication of components used to operate the pump 400. A third CAN bus (CAN 3) is operatively coupled to the drivetrain controller 532, the cab display of the user interface 520, a firefighting controller 550 of the controller 510, and a turret controller 552 of the controller 510.

Figure 14:
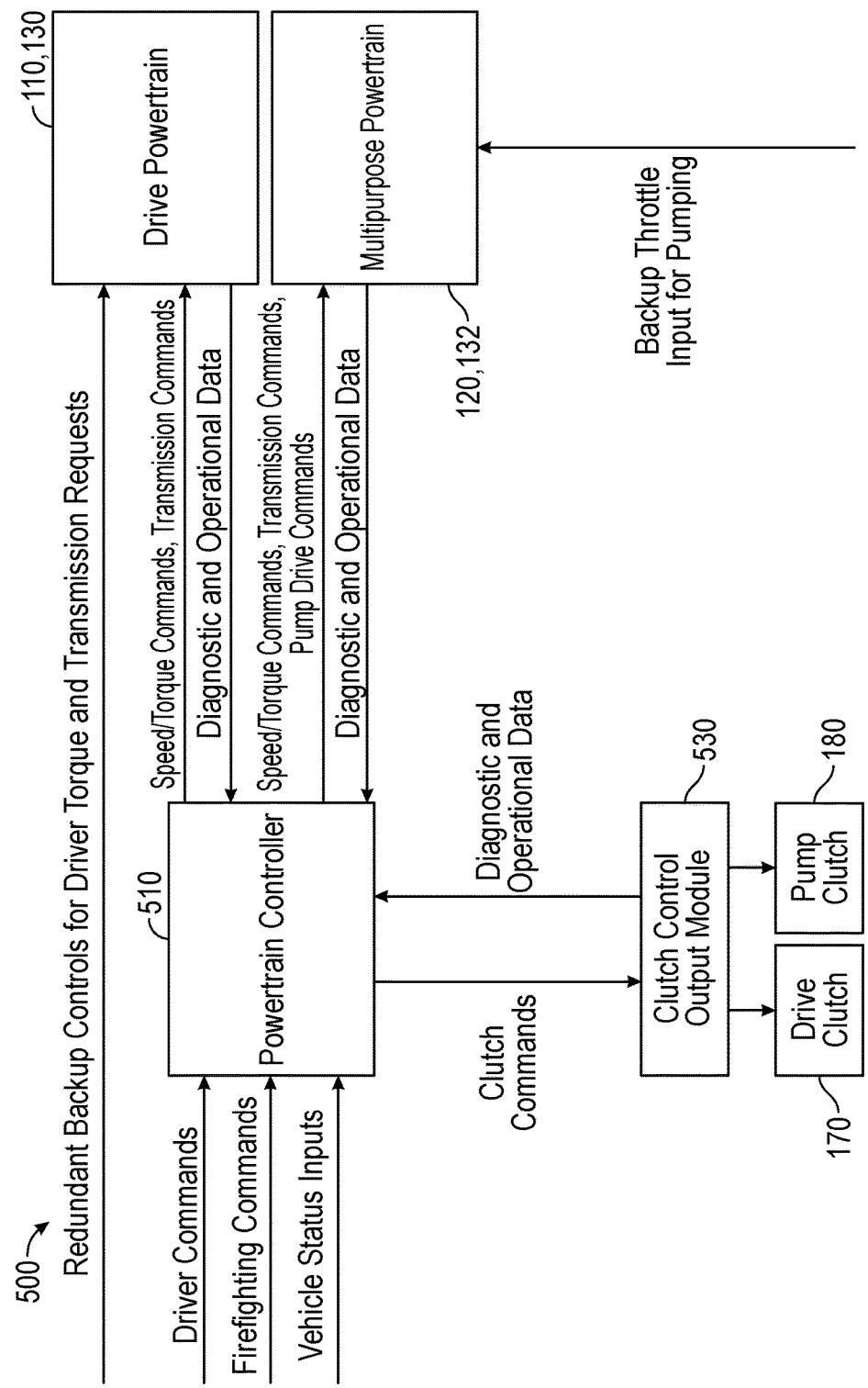
FIG. 14 is yet another block diagram of the control system of FIG. 12.

FIG. 14 illustrates the types of information that may pass between the various components of the control system 500. The controller 510 (e.g., a powertrain controller of the controller 510) may receive driver commands (e.g., through the accelerator pedal 526, etc.), firefighting commands (e.g., a desired flow rate of fluid discharged from the pump 400, etc.), and vehicle status inputs (e.g., battery voltages, fuel levels, etc.). The controller 510 (e.g., a powertrain controller of the controller 510) and the clutch control output module 530 exchange clutch commands (e.g., commands to engage or disengage a clutch) and diagnostic and operational data relating to the clutches. The controller 510 sends speed/torque commands (e.g., a target speed or target torque, a throttle input, etc.) to the drive engine 110 and the multipurpose engine 120 and transmission commands (e.g., a command to shift to a particular gear, etc.) to the drive transmission 130 and the multipurpose transmission 132. The controller 510 further sends pump drive commands (e.g., a target engine speed corresponding to a desired flow rate, a throttle input, a command to shift to a gear used when pumping, etc.) to the multipurpose engine 120 and the multipurpose transmission 132. The controller 510 further receives diagnostic and operational data relating to the engines and the transmissions. In the event of a system fault (e.g., in a fault mode of operation), an operator may bypass the controller 510 and use a second, redundant set of controls to send commands directly to the engines and/or transmissions. By way of example, an operator may send a desired torque and gear to the drive engine 110 and the drive transmission 130, respectively. The operator may further send a throttle input to the multipurpose engine 120 to facilitate pumping. In some embodiments, in a fault mode of operation, the operator uses the same set of controls (e.g., the shifter 524, the accelerator pedal 526, etc.), but a redundant or backup set of sensors on the controls provides a signal directly to the engines and/or transmissions.

Figures 15, 16:
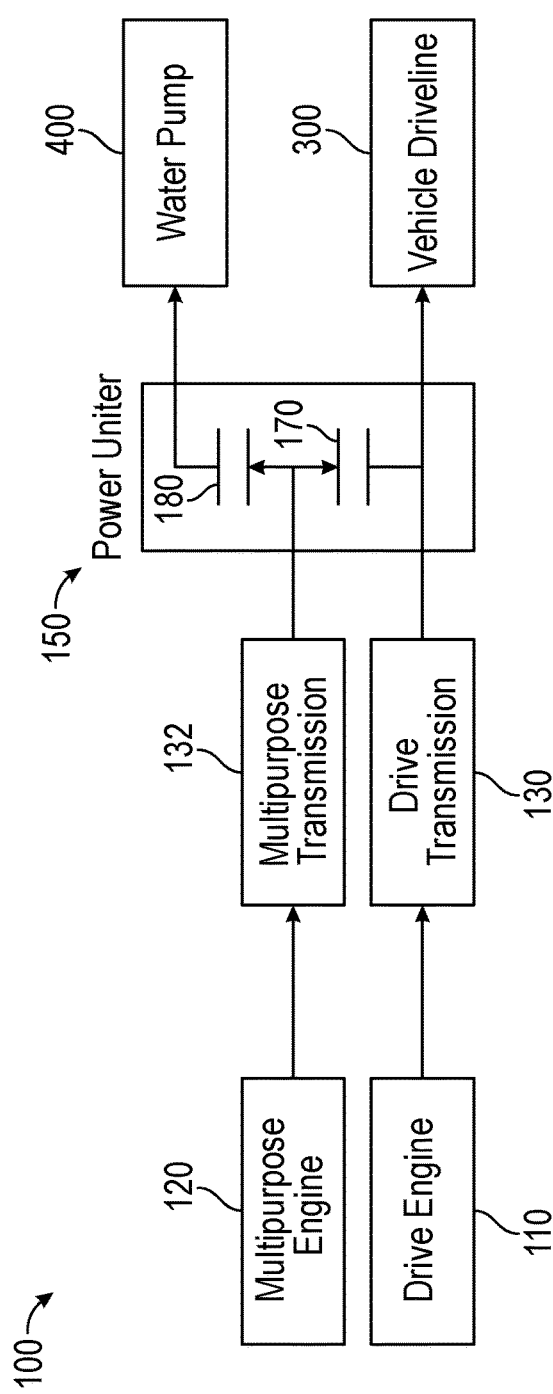
FIG. 15 is a block diagram illustrating a flow of energy through the powertrain of FIG. 2, according to an exemplary embodiment.
FIG. 16 is a table illustrating the configurations of pumps, engines, and transmissions of the powertrain of FIG. 2 during various modes of operation, according to an exemplary embodiment.

As shown in FIGS. 15 and 16, the controller 510 is configured to operate the fire fighting vehicle 10 in at least three modes of operation. In a stationary pumping mode, the multipurpose engine 120 powers (e.g., delivers mechanical energy to, etc.) the pump 400 while the driveline 300 is stationary and the drive engine 110 is at idle (i.e., is operating at an idle speed). In a pump and roll mode, the drive engine 110 powers the driveline 300, and the multipurpose engine 120 powers the pump 400. In a dual engine drive mode, both the drive engine 110 and the multipurpose engine 120 power the driveline 300. As shown in FIG. 16, the controller 510 is configured to selectively engage the drive clutch 170 and the pump clutch 180 to switch between the various modes of operation. By way of example, to enter the stationary pumping mode or the pump and roll mode, the controller 510 is configured to engage (e.g., close, connect, etc.) the pump clutch 180 and disengage (e.g., open, disconnect, etc.) the drive clutch 170. Disengaging the drive clutch 170 may include not engaging the drive clutch 170 (e.g., when the drive clutch 170 and/or the pump clutch 180 are biased and/or defaulted into a disengaged configuration, etc.). By way of another example, to enter the dual engine drive mode, the controller 510 may be configured to engage the drive clutch 170 and disengage the pump clutch 180. The dual engine drive mode facilitates applying the mechanical energy output from both the drive engine 110 and the multipurpose engine 120 to the driveline 300 (e.g., when driving without the need for pumping water, etc.). In some embodiments, the controller 510 is configured to engage only one of the drive clutch 170 or the pump clutch 180 at a time (i.e., is configured to prevent engaging the drive clutch 170 and the pump clutch 180 simultaneously). In some embodiments, the fire fighting vehicle 10 is selectively reconfigurable between the pump and roll mode and the dual engine drive mode while the fire fighting vehicle 10 is traveling at any speed.

As shown in the table of FIG. 16, the controller 510 controls the drive engine 110, the multipurpose engine 120, the drive transmission 130, and the multipurpose transmission 132 differently based on the current mode of operation of the fire fighting vehicle 10. The drive engine 110 has a drive engine mode of operation (i.e., D.E. Mode), and the multipurpose engine 120 has a multipurpose engine mode of operation (i.e., M.P.E. Mode). The drive engine 110 and/or the multipurpose engine 120 may be selectively reconfigurable between an idle mode, a torque control mode, and a speed control mode. In the idle mode, the drive engine 110 and/or the multipurpose engine 120 run without any load. In embodiments where the drive engine 110 and/or the multipurpose engine 120 are internal combustion engines, the controller 510 may run the engines at an idle speed (e.g., approximately 1000 rpm). In embodiments where the drive engine 110 and/or the multipurpose engine 120 are electric motors, the controller 510 may not power the motors (e.g., such that the motors are stationary in the idle mode). In the torque control mode, the controller 510 varies the output of the drive engine 110 and/or the multipurpose engine 120 (e.g., by varying the throttle, etc.) to reach a target engine output torque. In the speed control mode, the controller 510 varies the output of the drive engine 110 and/or the multipurpose engine 120 to reach a target engine speed.

The engine modes in each mode of operation of the vehicle are shown, according to an exemplary embodiment, in FIG. 16. The controller 510 may be configured to control the drive engine 110 and/or the multipurpose engine 120 in the torque control mode when the engine is driving the driveline 300 (e.g., in the dual engine drive mode, in the pump and roll mode). The controller 510 may be configured to control the multipurpose engine 120 in the speed control mode when the multipurpose engine 120 is driving the pump 400 (e.g., in the stationary pumping mode, in the pump and roll mode). The target speed of the multipurpose engine 120 may be proportional to a desired flow rate (e.g., 0 GPM, 100 GPM, 1000 GPM, etc.) of fluid exiting the pump 400 (e.g., provided by the operator through the user interface 520). The relationship between the desired flow rate and the target speed of the multipurpose engine 120 may be stored in the memory 514.

The drive transmission 130 (i.e., the D XMSN) and the multipurpose transmission 132 (i.e., the M.P. XMSN) may be configured to shift between a specified range of gears (i.e., gear ratios) based on the current mode of operation of the vehicle, as shown in FIG. 16. In the dual engine drive mode of operation, the controller 510 may shift both transmissions within a first range of gears (e.g., gears 2-8). In some embodiments, the controller 510 is configured to control the shifting of both transmissions similarly (e.g., shifting into the same gear simultaneously). In the pump and roll mode of operation, the controller 510 may shift the drive transmission 130 into a second range (e.g., a range of low gears, gears 1-4) and shift the multipurpose transmission 132 into a predetermined pumping gear (e.g., a high gear, gear 7). Holding the drive transmission 130 in a low gear range (i.e., a low speed, high torque gear range) may facilitate providing the torque required to drive the fire fighting vehicle 10 with only one engine powering the driveline 300. Accordingly, the maximum speed of the fire fighting vehicle 10 may be lower in the pump and roll mode than in the dual engine drive mode. In the stationary pumping mode of operation, the controller 510 may shift the drive transmission 130 to a neutral gear (e.g., disconnecting drive engine 110 from power uniter 150) and shift the multipurpose transmission 132 into the predetermined pumping gear. The neutral gear facilitates configuring the drive engine 110 in the idle mode without propelling the fire fighting vehicle 10.

When the fire fighting vehicle 10 is in a driving mode of operation (e.g., the pump and roll mode, the dual engine drive mode) where the fire fighting vehicle is propelled, the operator may control one or both of the drive engine 110 and the multipurpose engine 120 using the accelerator pedal 526. The level to which the accelerator pedal 526 is depressed may correspond with an engine torque command from the operator and accordingly, a desired acceleration of the fire fighting vehicle 10. By way of example, if the accelerator pedal 526 is pressed through 75% of its range, this may correspond to a 75% torque command (e.g., a command indicating that the engines driving the driveline 300 should output 75% of their available torque) from the operator. In some embodiments, the controller 510 receives (e.g., through CAN, through wireless communication, etc.) and processes this command. The controller 510 may be configured to control one or more of the drive engine 110 and/or the multipurpose engine 120 based on the received engine torque command. In some embodiments, the engine torque command sent to the drive engine 110 is the same as the engine torque command sent to the multipurpose engine 120 while in the dual engine drive mode.

When the fire fighting vehicle 10 is in a pumping mode of operation (e.g., the pump and roll mode, the stationary pumping mode, etc.) or another mode of operation that uses mechanical energy from the power takeoff interface 158, the operator may control the multipurpose engine 120 using the user interface 520 (e.g., a hand throttle, etc.). By way of example, the operator may provide a desired flow rate (e.g., in gallons per minute) of the pump 400, and the controller 510 may control the multipurpose engine 120 to achieve a target speed corresponding to the desired flow rate. The controller 510 may additionally or alternatively control the multipurpose engine 120 using control logic present in the memory 514. By way of example, the controller 510 may automatically control the multipurpose engine 120 to achieve a certain speed. By way of another example, the controller 510 may vary the control of the multipurpose engine 120 in response to various sensor inputs (e.g., engine speed sensors, pump pressure or discharge sensors, etc.) and/or to various limits placed on the vehicle (e.g., a maximum pressure of the pump 400, a maximum speed of the pump 400, etc.).

In some embodiments, the controller 510 is configured to enter a fault mode of operation if a fault is detected (e.g., a loss of communication between the controller 510 and one or both of the drive engine 110 and/or the multipurpose engine 120 or another component shown in FIG. 12). In the fault mode, the controller 510 may be configured to disengage one or both of the drive clutch 170 and/or the pump clutch 180. The user interface 520 may include one or more redundant interfaces that can be used when a fault is detected. As shown in FIG. 14, these interfaces may communicate directly (e.g., without information passing through controller 510) with the component that the interface is configured to control (e.g., the engines, the transmissions, etc.). By way of example, a backup throttle may facilitate controlling the drive engine 110 directly and/or the multipurpose engine 120 directly (e.g., without passing a command through the controller 510, etc.). By way of another example, an interface may be included to manually control one or more of the drive clutch 170 and/or the pump clutch 180. The controller 510 may determine one or more alternate control methods of the vehicle utilizing the remaining functional components. By way of example, if communication is lost between the drive engine 110 and the controller 510, the controller 510 may be configured to initiate a control method that utilizes manual control of the drive engine 110 while still operating the other systems normally.

Figure 17:
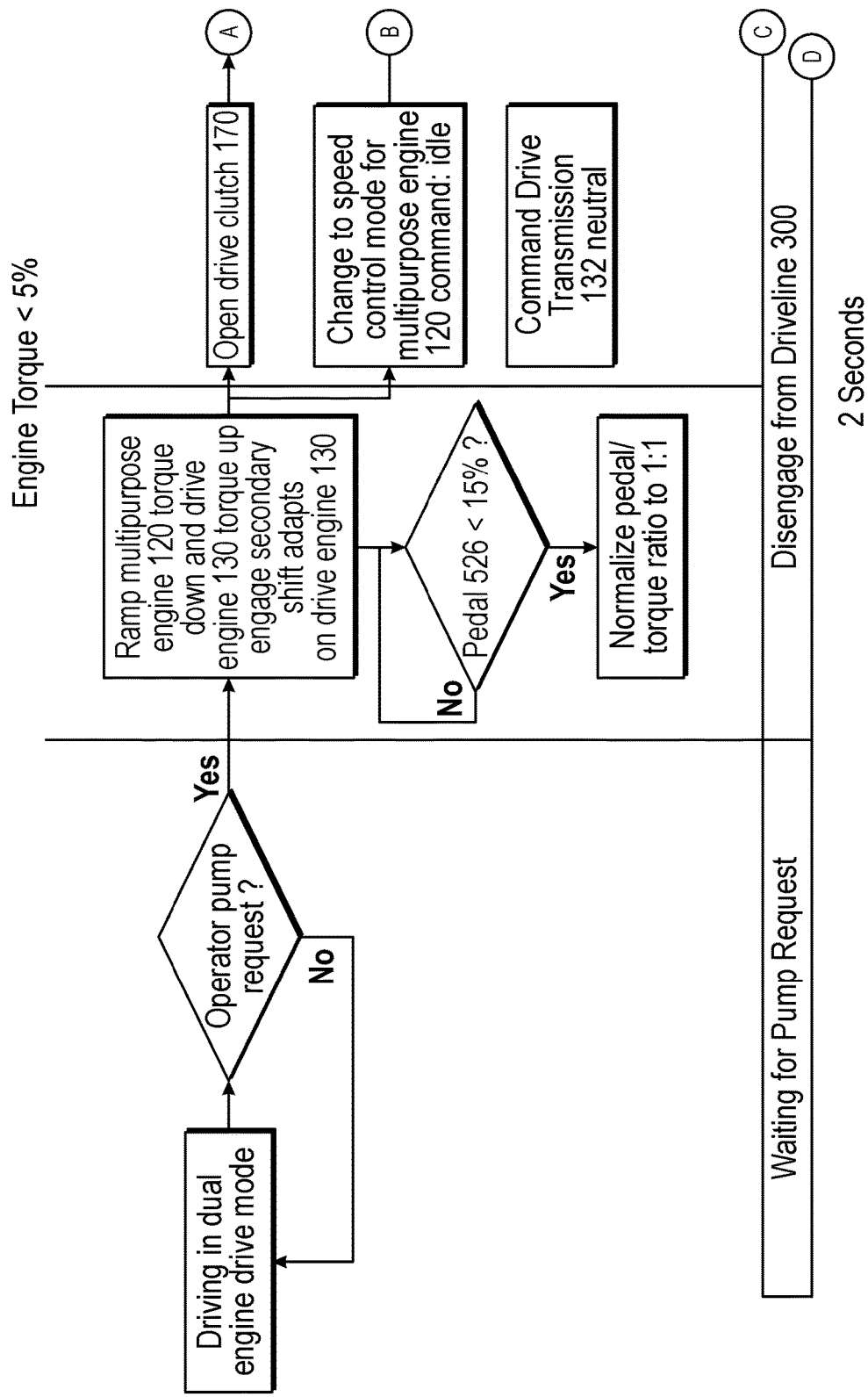
FIG. 17 is a flowchart illustrating a method of changing a powertrain from a dual engine drive mode of operation to a pumping mode of operation, according to an exemplary embodiment.
Figure 17:
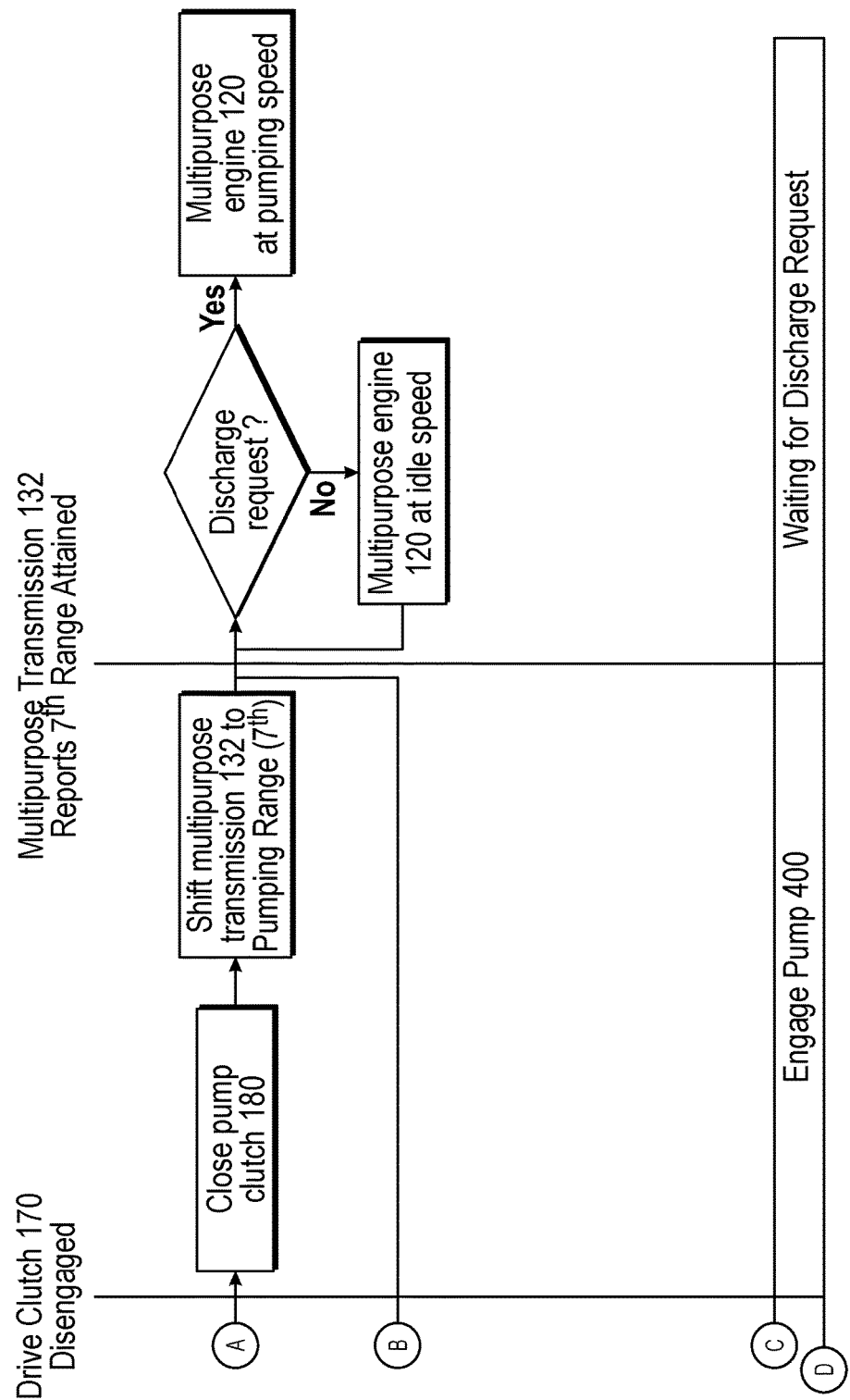
Figure 18:
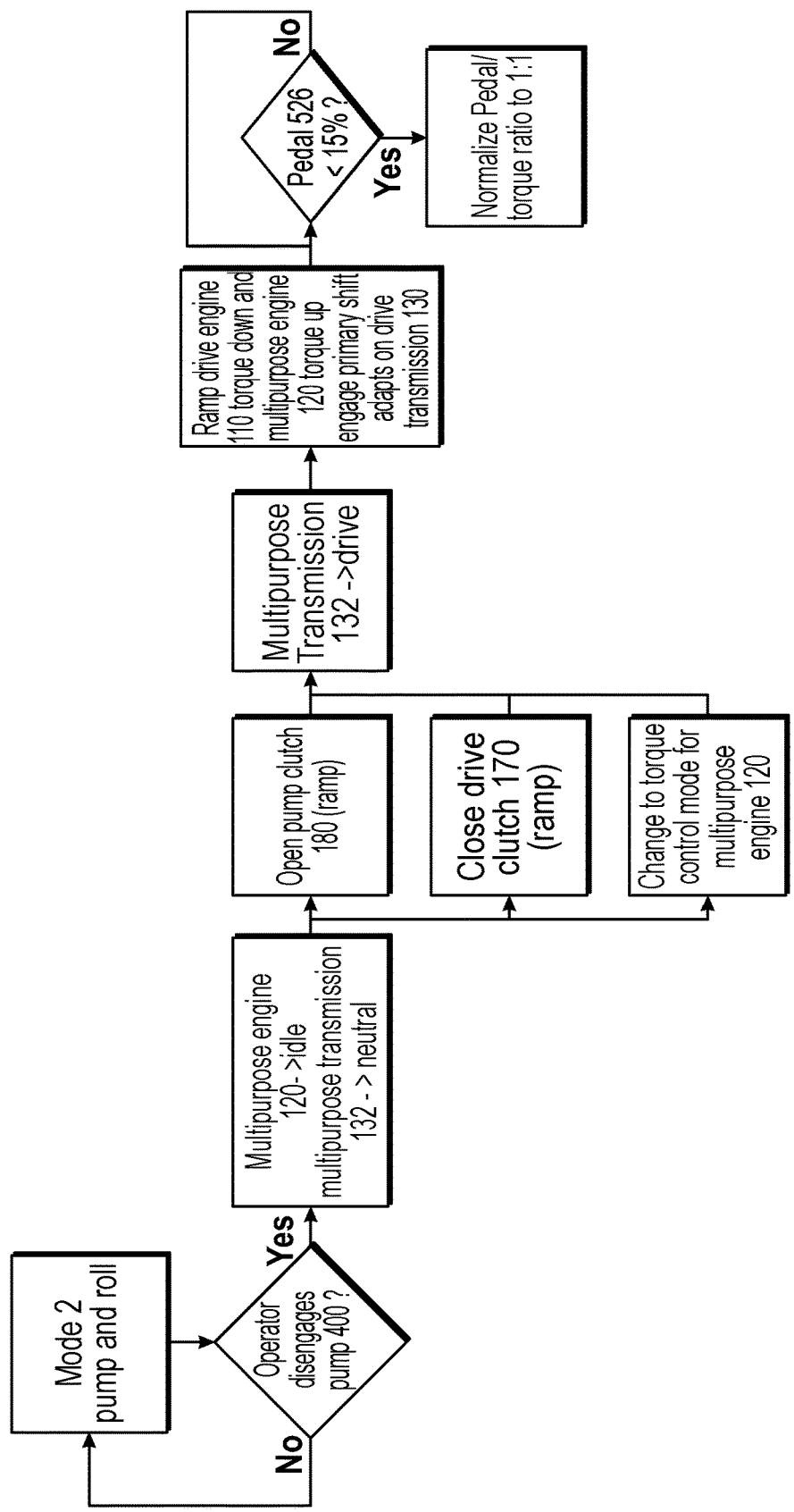
FIG. 18 is a flowchart illustrating a method of changing a powertrain from a pumping mode of operation to a dual engine drive mode of operation, according to an exemplary embodiment.

FIGS. 17 and 18 illustrate methods of changing between modes of operation of the fire fighting vehicle 10. Specifically, FIGS. 17 and 18 illustrate a method of changing from the dual engine drive mode to the pump and roll mode and a method of changing from the pump and roll mode to the dual engine drive mode, respectively. In some embodiments, the operator communicates a desire to change between modes (e.g., a command to begin pumping, a command to cease pumping, etc.) through the user interface 520. By way of example, the user may interact with a touchscreen of the display 522 and/or the accelerator pedal 526. The controller 510 may be configured to employ the method illustrated in FIG. 17 or the method illustrated in FIG. 18, as appropriate, to change to the desired mode.

Referring to FIG. 17, upon receiving a request to change to a pumping mode of operation, the controller 510 reduces the target torque of the multipurpose engine 120 and increases the target torque of the drive engine 110. If the accelerator pedal 526 is pressed through less than a threshold percentage (e.g., 15%, etc.) of its total range, the controller 510 may be configured to normalize the pedal depression/torque ratio to a 1:1 ratio. By way of example, the controller 510 would register a 10% depression of the accelerator pedal 526 with a target torque for the drive engine 110 corresponding to 10% of its maximum available torque. Once the torque output of the drive engine 110 and/or the multipurpose engine 120 falls below a threshold level (e.g., 5% of the maximum available torque, etc.), the controller 510 opens the drive clutch 170 and controls the multipurpose engine 120 to achieve an idle speed. The controller 510 may additionally shift the drive transmission 130 to neutral if the user instead wishes to change to the stationary pumping mode of operation. The controller 510 subsequently closes the pump clutch 180 and shifts the multipurpose transmission 132 to a gear used while pumping (e.g., gear 7, etc.). The controller 510 maintains the multipurpose engine 120 at an idle speed until a discharge request (e.g., a desired flow rate from the pump) is received. The controller 510 then controls the multipurpose engine 120 to achieve a speed corresponding to the discharge request.

Referring to FIG. 18, upon receiving a request from a user to disengage the pump 400, the controller 510 controls the multipurpose engine 120 to achieve an idle speed and shifts the multipurpose transmission 132 to neutral. Subsequently, the controller 510 opens the pump clutch 180 (e.g., in a gradual or ramped manner), closes the drive clutch 170 (e.g., in a gradual or ramped manner), and changes the multipurpose engine 120 to a torque control mode. The controller 510 then shifts the multipurpose transmission 132 to a driving gear, ramps the target torque of the drive engine 110 down, and ramps the target torque of the multipurpose engine 120 up. If the accelerator pedal 526 is pressed through less than a threshold percentage (e.g., 15%, etc.) of its total range, the controller 510 may be configured to normalize the pedal depression/torque ratio to a 1:1 ratio. By way of example, the controller 510 would register a 10% depression of the accelerator pedal 526 with a target torque for the drive engine 110 corresponding to 10% of its maximum available torque.

The methods of changing between modes of operation of the vehicle may incorporate various steps. By way of example, the torque and/or speed output of the drive engine 110 and/or the multipurpose engine 120 may be reduced (e.g., to zero, etc.) or increased (e.g., to a threshold value, etc.) before engaging or disengaging one or both of the drive clutch 170 and/or the pump clutch 180. The speed and/or torque outputs of the drive engine 110 and/or the multipurpose engine 120 may be ramped (i.e., changed gradually over time, etc.) to smooth the transition between different modes. The speed and/or torque outputs of the drive engine 110 or the multipurpose engine 120 may be ramped relative to the speed and/or torque outputs of the other of the drive engine 110 or the multipurpose engine 120. A user input may be monitored (e.g., accelerator pedal 526 position, etc.), and another step may occur once the user input reaches a threshold level (e.g., below a threshold level, etc.). By way of example, a ratio between the torque command sent to the drive engine 110 and a position of the accelerator pedal 526 (e.g., depressed 15% through the overall range of movement of the accelerator pedal 526, etc.) may be maintained by the controller 510 until the signal of the accelerator pedal 526 falls below a certain threshold position (e.g., less than 10% depressed, etc.) and/or until the drive clutch 170 and/or the pump clutch 180 is disengaged.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

For purposes of this disclosure, the term "coupled" means the joining of two members directly or indirectly to one another. Such joining may be stationary in nature (e.g., permanent, etc.) or moveable in nature (e.g., removable, releasable, etc.). Such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The construction and arrangements of the systems and methods, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements. The position of elements may be reversed or otherwise varied. The nature or number of discrete elements or positions may be altered or varied. Although the figures may show a specific order of method steps, the order of the steps may differ from what is depicted. Also two or more steps may be performed concurrently or with partial concurrence. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. All such variations are within the scope of the disclosure. Likewise, software implementations could be accomplished with standard programming techniques with rule based logic and other logic to accomplish the various connection steps, processing steps, comparison steps and decision steps. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle, comprising:
   a chassis;
   a driveline coupled to the chassis, the driveline including a plurality of tractive elements, wherein the driveline is configured to receive rotational mechanical energy and propel the vehicle;
   an accessory coupled to the chassis and configured to receive rotational mechanical energy;
   a first driver and a second driver each coupled to the chassis and configured to provide a rotational mechanical energy;
   a power transmission device comprising:
      a housing coupled to the chassis;
      a first input shaft rotatably coupled to the housing and configured to receive the rotational mechanical energy from the first driver;
      a second input shaft rotatably coupled to the housing and configured to receive the rotational mechanical energy from the second driver;
      a primary output interface rotatably coupled to the housing and coupled to the driveline;
      a power takeoff shaft rotatably coupled to the housing, radially aligned with the first input shaft, and coupled to the accessory;
      a first clutch configured to selectively rotationally couple the first input shaft to the primary output interface such that at least a portion of the rotational mechanical energy from the first driver passes through the first clutch and the primary output interface to the driveline when the first clutch is engaged; and
      a second clutch configured to selectively rotationally couple the first input shaft to the power takeoff shaft such that at least a portion of the rotational mechanical energy from the first driver passes through the second clutch and the power takeoff shaft to the accessory when the second clutch is engaged;
   wherein at least one of:
      (a) the power takeoff shaft includes a power takeoff interface coupled to the accessory, and the power takeoff interface and the primary output interface are positioned along a first side of the housing;
      (b) the vehicle further comprises:
         a first gear at least selectively coupled to the first input shaft; and
         a second gear coupled to the second input shaft;
         wherein the first gear and the second gear are rotationally coupled with one another, wherein the first input shaft extends on a first side of the first gear, wherein the power takeoff shaft is disposed on a second side of the first gear, and wherein the second side of the first gear is opposite the first side of the first gear;
      (c) the accessory is a pump that is coupled to the power takeoff shaft and configured to provide a flow of fluid in response to a rotation of the power takeoff shaft; or
      (d) the primary output interface is part of a primary output shaft, the primary output shaft is radially offset a first distance from the first input shaft, the second input shaft is radially offset a second distance from the first input shaft, and the second distance is larger than the first distance.

2. The vehicle of claim 1, wherein the second clutch is directly coupled to both the first input shaft and the power takeoff shaft, and wherein the first input shaft, the power takeoff shaft, and the second clutch are radially aligned.

3. The vehicle of claim 1, wherein the power takeoff shaft includes the power takeoff interface coupled to the accessory, and wherein the power takeoff interface and the primary output interface are positioned along the first side of the housing.

4. The vehicle of claim 3, wherein the first driver and the second driver are disposed on a second side of the housing, wherein the second side of the housing is opposite the first side of the housing.

5. The vehicle of claim 1, further comprising:
the first gear at least selectively coupled to the first input shaft; and
the second gear coupled to the second input shaft;
wherein the first gear and the second gear are rotationally coupled with one another, wherein the first input shaft extends on the first side of the first gear, wherein the power takeoff shaft is disposed on the second side of the first gear, and wherein the second side of the first gear is opposite the first side of the first gear.

6. The vehicle of claim 5, further comprising a third gear, wherein the primary output interface is part of the primary output shaft, the primary output shaft being radially offset from both the first input shaft and the second input shaft, wherein the third gear is coupled to the primary output shaft, and wherein the first gear is rotationally coupled to the second gear through the third gear.

7. The vehicle of claim 6, wherein the second gear is fixedly coupled to the second input shaft, wherein the third gear is fixedly coupled to the primary output shaft, and wherein the second gear is directly rotationally coupled to the third gear.

8. The vehicle of claim 1, wherein the accessory is the pump that is coupled to the power takeoff shaft and configured to provide the flow of fluid in response to the rotation of the power takeoff shaft.

9. The vehicle of claim 1, wherein the primary output interface is part of the primary output shaft, wherein the primary output shaft is radially offset the first distance from the first input shaft, wherein the second input shaft is radially offset the second distance from the first input shaft, and wherein the second distance is larger than the first distance.

10. A power transmission device, comprising:
a housing;
a first input shaft and a second input shaft each rotatably coupled to the housing;
a primary output interface rotatably coupled to the housing;
a power takeoff shaft rotatably coupled to the housing;
a first clutch configured to selectively rotationally couple the first input shaft to the primary output interface such that at least a portion of a rotational mechanical energy input received by the first input shaft passes through the first clutch to the primary output interface when the first clutch is engaged; and
a second clutch configured to selectively rotationally couple the first input shaft to the power takeoff shaft such that at least a portion of the rotational mechanical energy input received by the first input shaft passes through the second clutch to the power takeoff shaft when the second clutch is engaged;
wherein the primary output interface is directly rotationally coupled to the second input shaft such that at least a portion of a rotational mechanical energy input received by the second input shaft passes to the primary output interface; and
wherein at least one of:
(a) the second clutch is directly coupled to both the first input shaft and the power takeoff shaft, and the first input shaft, the power takeoff shaft, and the second clutch are radially aligned;
(b) the power takeoff shaft includes a power takeoff interface configured to be coupled to an accessory, and the power takeoff interface and the primary output interface are positioned along a first side of the housing;
(c) the power transmission device further comprises:
a first gear at least selectively coupled to the first input shaft; and
a second gear coupled to the second input shaft;
wherein the first gear and the second gear are rotationally coupled with one another, wherein the first input shaft extends on a first side of the first gear, and wherein the power takeoff shaft extends on a second side of the first gear opposite the first side; or
(d) the primary output interface is part of a primary output shaft that is radially offset from the second input shaft, and the primary output interface is directly rotationally coupled to the second input shaft through a plurality of gears.

11. The power transmission device of claim 10, wherein the second clutch is directly coupled to both the first input shaft and the power takeoff shaft, and wherein the first input shaft, the power takeoff shaft, and the second clutch are radially aligned.

12. The power transmission device of claim 10, wherein the power takeoff shaft includes the power takeoff interface configured to be coupled to the accessory, and wherein the power takeoff interface and the primary output interface are positioned along the first side of the housing.

13. The power transmission device of claim 12, wherein the first input shaft includes a first input interface configured to be coupled to a first source of rotational mechanical energy, wherein the second input shaft includes a second input interface configured to be coupled to a second source of rotational mechanical energy, and wherein the first input interface and the second input interface are positioned along a second side of the housing opposite the first side.

14. The power transmission device of claim 10, further comprising:
the first gear at least selectively coupled to the first input shaft; and
the second gear coupled to the second input shaft;
wherein the first gear and the second gear are rotationally coupled with one another, wherein the first input shaft extends on the first side of the first gear, and wherein the power takeoff shaft extends on the second side of the first gear opposite the first side.

15. The power transmission device of claim 14, further comprising a third gear, wherein the primary output interface is part of the primary output shaft, the primary output shaft being radially offset from both the first input shaft and the second input shaft, wherein the third gear is coupled to the primary output shaft, and wherein the first gear is rotationally coupled to the second gear through the third gear.

16. The power transmission device of claim 15, wherein the first gear is radially aligned with the first input shaft, and wherein the first clutch is configured to selectively rotationally couple the first input shaft to the primary output shaft by selectively coupling the first gear to the first input shaft.

17. The power transmission device of claim 10, wherein the primary output interface is part of the primary output shaft that is radially offset from the second input shaft, and wherein the primary output interface is directly rotationally coupled to the second input shaft through the plurality of gears.

18. A vehicle, comprising:
a chassis;
a driveline coupled to the chassis, the driveline including a plurality of tractive elements, wherein the driveline is configured to receive mechanical energy and propel the vehicle;
a first driver and a second driver each coupled to the chassis;
a power transmission device configured to receive mechanical energy from the first driver and the second driver, the power transmission device comprising:
a first input interface coupled to the first driver;
a second input interface coupled to the second driver;
a primary output interface coupled to the driveline;
a power takeoff interface;
a first clutch configured to selectively rotationally couple the first input interface to the primary output interface; and
a second clutch configured to selectively rotationally couple the first input interface to the power takeoff interface; and
a controller configured to selectively reconfigure the vehicle between a plurality of different modes of operation, wherein the second input interface is rotationally coupled to the primary output interface in all of the modes of operation;
wherein in a first one of the modes of operation, the controller is configured to engage the first clutch and disengage the second clutch, thereby configuring the power transmission device to transfer mechanical energy from the first driver to the driveline;
wherein in a second one of the modes of operation, the controller is configured to engage the second clutch and disengage the first clutch, thereby configuring the power transmission device to transfer mechanical energy from the first driver to the power takeoff interface; and
wherein at least one of:
(a) during the first one of the modes of operation, the controller is configured to receive a user input relating to a desired acceleration of the vehicle and control both the first driver and the second driver to output a torque corresponding to the user input; or
(b) the vehicle further comprises a pump coupled to the power takeoff interface and configured to use mechanical energy and provide a flow of fluid, and during the second one of the modes of operation, the controller is configured to control a speed of the first driver to reach a target speed such that the pump supplies fluid at a desired flow rate.

19. The vehicle of claim 18, wherein during the first one of the modes of operation, the controller is configured to receive the user input relating to the desired acceleration of the vehicle and control both the first driver and the second driver to output the torque corresponding to the user input.

20. The vehicle of claim 18, further comprising the pump coupled to the power takeoff interface and configured to use mechanical energy and provide the flow of fluid, wherein during the second one of the modes of operation, the controller is configured to control the speed of the first driver to reach the target speed such that the pump supplies fluid at the desired flow rate.

* * * * *